(12) United States Patent
Nance et al.

(10) Patent No.: US 10,901,102 B2
(45) Date of Patent: Jan. 26, 2021

(54) DIGITAL SEISMIC SOURCE SIGNATURE NEAR-FIELD HYDROPHONE

(71) Applicant: TELEDYNE INSTRUMENTS, INC., Thousand Oaks, CA (US)

(72) Inventors: William Allen Nance, Fredericksburg, TX (US); Keith Kunz, Fredericksburg, TX (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 942 days.

(21) Appl. No.: 15/094,485

(22) Filed: Apr. 8, 2016

(65) Prior Publication Data

US 2016/0299242 A1 Oct. 13, 2016

Related U.S. Application Data

(60) Provisional application No. 62/145,298, filed on Apr. 9, 2015.

(51) Int. Cl.
*G01V 1/18* (2006.01)
*G01V 1/137* (2006.01)

(52) U.S. Cl.
CPC ............ *G01V 1/186* (2013.01); *G01V 1/137* (2013.01)

(58) Field of Classification Search
CPC . G01V 1/18; G01V 1/20; G01V 1/186; G01V 1/137
See application file for complete search history.

(56) References Cited

U.S. PATENT DOCUMENTS

| | | | | |
|---|---|---|---|---|
| 4,047,591 A | * | 9/1977 | Ward | F41B 11/00 181/107 |
| 4,621,170 A | * | 11/1986 | Picandet | H04B 3/548 340/333 |
| 4,725,950 A | | 2/1988 | Woods | |
| 5,627,798 A | * | 5/1997 | Siems | G01V 1/22 340/870.11 |
| 5,668,775 A | * | 9/1997 | Hatteland | G01V 1/3835 367/19 |
| 8,634,276 B2 | | 1/2014 | Morozov et al. | |
| 10,144,035 B1 | | 12/2018 | Morozov et al. | |
| 10,424,284 B2 | | 9/2019 | Morozov | |

(Continued)

*Primary Examiner* — Hovhannes Baghdasaryan
*Assistant Examiner* — Amie M Ndure
(74) *Attorney, Agent, or Firm* — K&L Gates LLP

(57) ABSTRACT

A near-field hydrophone is disclosed. The near-field hydrophone includes a housing, a piezoelectric element configured to produce an analog signal in response to an acoustic signal generated by the release of compressed air into water, an analog circuit coupled to the piezoelectric element, wherein the analog circuit is configured to receive the analog signal and to produce a conditioned analog signal, an analog-to-digital converter configured to receive the conditioned analog signal and to produce a digitized form of the conditioned analog signal, and a processor coupled to a memory circuit and to the analog-to-digital converter, wherein the processor is configured to control the operation of the analog-to-digital converter and to provide a digitized serial communication output corresponding to the digitized form of the conditioned analog signal. The piezoelectric element, the analog circuit, the analog-to-digital converter, the processor, and the memory circuit are located within the housing.

10 Claims, 15 Drawing Sheets

(56) References Cited

U.S. PATENT DOCUMENTS

| | | | |
|---|---|---|---|
| 2002/0071345 A1* | 6/2002 | Chiang | G01S 7/521 367/138 |
| 2003/0026168 A1* | 2/2003 | Behn | G01V 1/22 367/76 |
| 2005/0052951 A1* | 3/2005 | Ray | G01V 1/166 367/188 |
| 2007/0263489 A1* | 11/2007 | Vaage | G01V 1/137 367/144 |
| 2008/0205191 A1* | 8/2008 | Coste | G01V 1/3835 367/15 |
| 2008/0285380 A1* | 11/2008 | Rouquette | G01V 1/20 367/15 |
| 2011/0085417 A1* | 4/2011 | Ronnow | G01V 1/20 367/38 |
| 2011/0194376 A1 | 8/2011 | Hallock et al. | |
| 2012/0195163 A1* | 8/2012 | Groenaas | G01V 1/3817 367/19 |
| 2013/0044565 A1* | 2/2013 | Barr | G01P 15/09 367/20 |
| 2014/0140169 A1* | 5/2014 | Cambois | G01V 1/3826 367/16 |
| 2019/0060953 A1 | 2/2019 | Morozov et al. | |

* cited by examiner

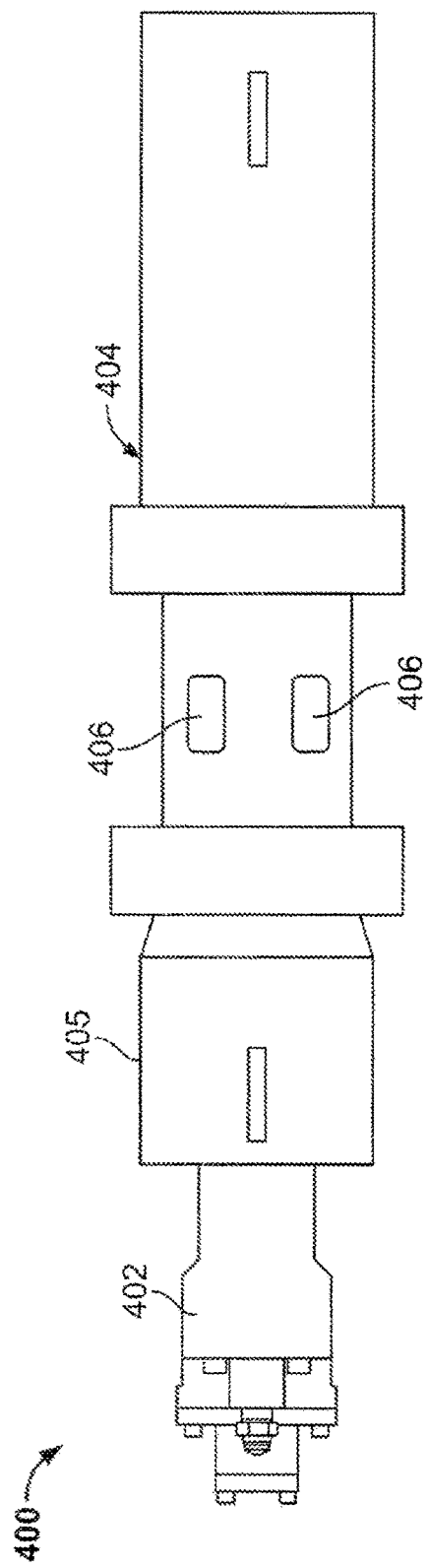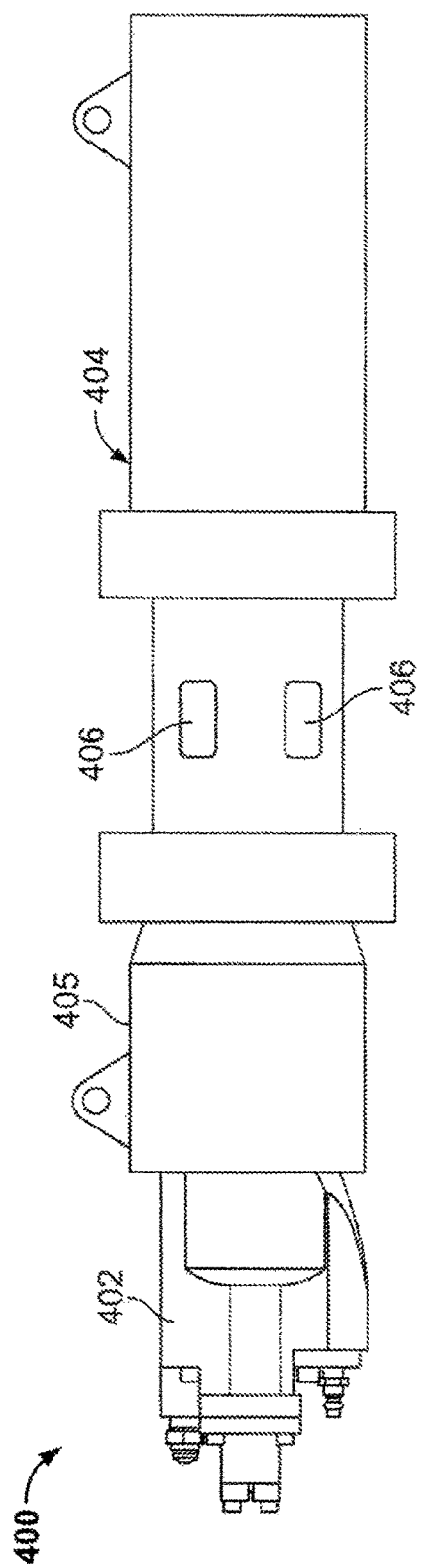

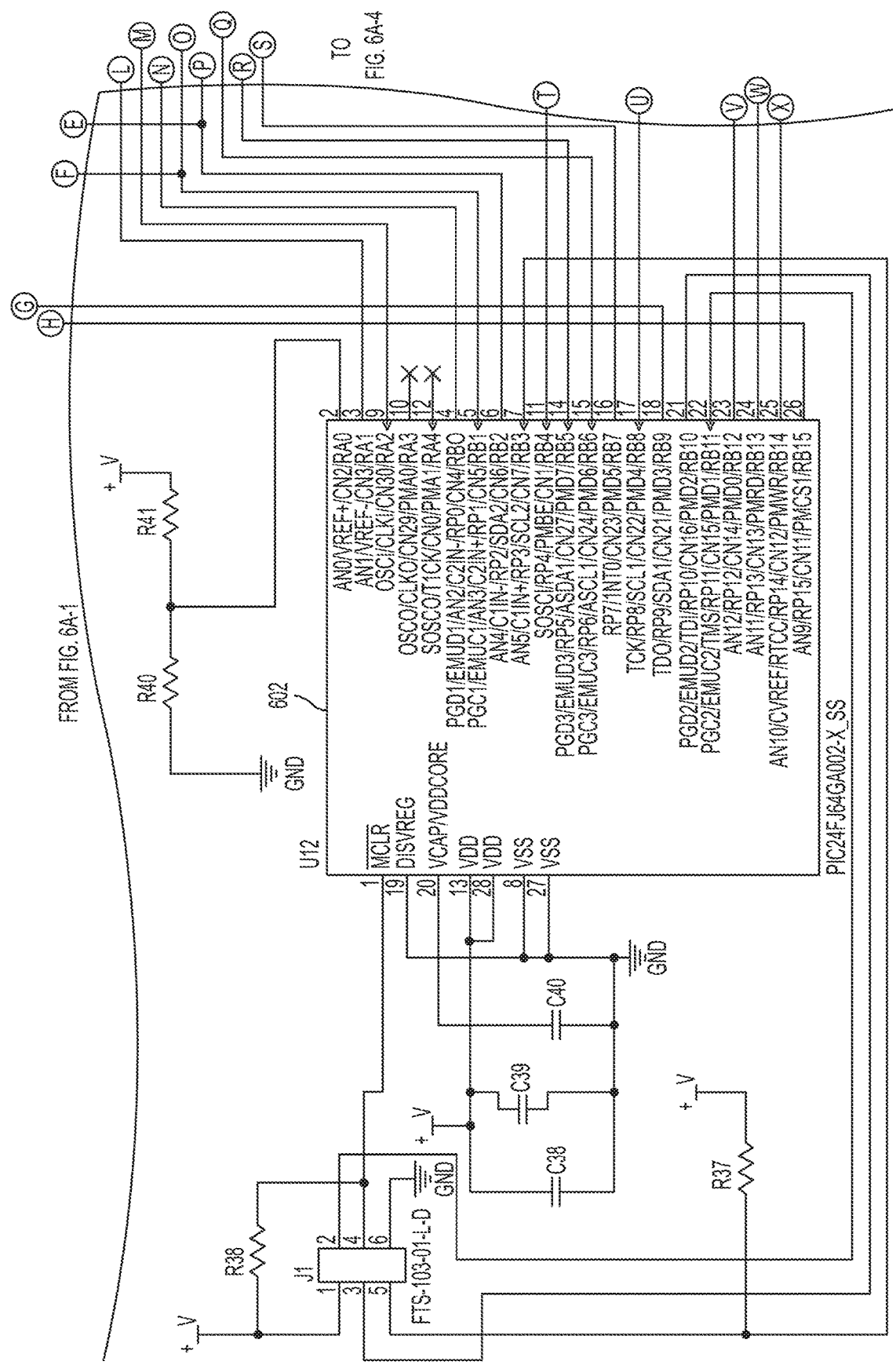

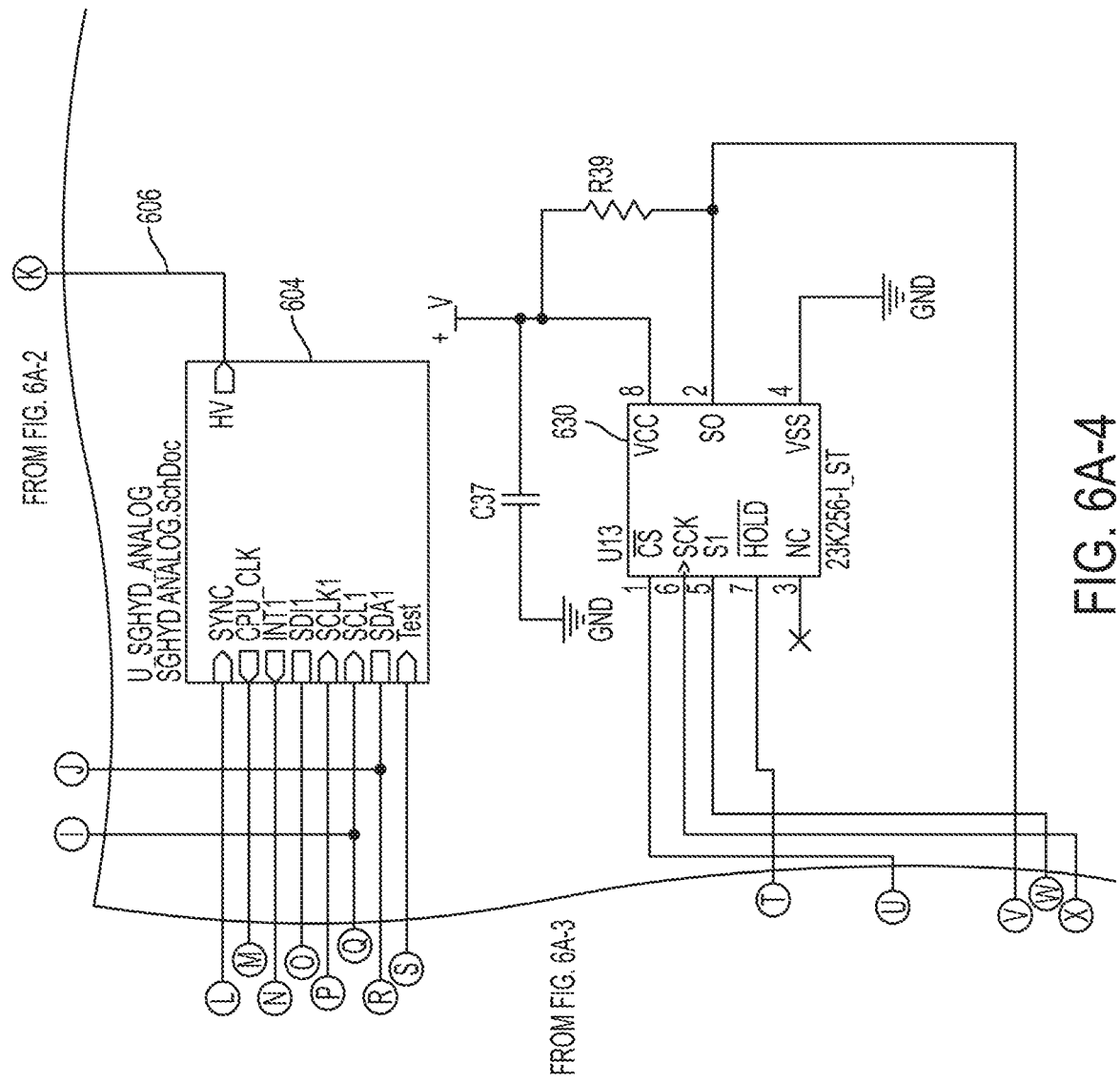

DIGITAL SEISMIC SOURCE SIGNATURE NEAR-FIELD HYDROPHONE

CROSS-REFERENCE TO RELATED APPLICATIONS

This application claims the benefit under 35 U.S.C. § 119(e) of U.S. Provisional Patent Application Ser. No. 62/145,298, entitled DIGITAL SEISMIC SOURCE SIGNATURE NEAR-FIELD HYDROPHONE, filed Apr. 9, 2015, the entire disclosure of which is hereby incorporated by reference herein.

INTRODUCTION

The present disclosure relates to a digital seismic source signature near-field hydrophone for use with air guns used as a source of seismic energy for marine seismic surveys. Air guns are typically deployed in an air gun array towed by a vessel. The air gun array can include several clusters of air guns, each submersed in water and suspended from a flotation device towed by the vessel. The vessel controls the air gun array to generate seismic source signals. To generate a seismic source signal the vessel fires the air guns in the array simultaneously, and the resulting seismic signal interacts with geological features beneath the ocean floor. Reflected seismic signals are collected and analyzed to identify properties of subsurface geological formations.

Generally, a conventional seismic source signature near-field hydrophone digitizer is located external to the hydrophone. In some instances, the digitizer is located on the boat or vessel or in modules in and around the air gun and in some instances the digitizer is located in the air gun itself. In regard to the latter configuration, the seismic source signature near-field hydrophone digitizer monitors the pressure inside the air gun and digitizes the hydrophone signal. The near-field hydrophone employs a pair of wires coupled to the hydrophone, mounted about a meter or so away, so the digitization of the near-field hydrophone information in all these instances cases was either inside the air gun, or in a module placed close to the air guns, or back on the boat. Thus a cable or a twisted pair of wires is provided between the hydrophone element and the seismic source signature near-field hydrophone digitizer, which becomes a source of signal noise that degrades the wanted seismic signals.

In an effort to reduce the noise in the hydrophone signal that is picked up from the environment on the cable between the hydrophone element and the digitizer, it may be desirable to remove the cable or twisted pair of wires between the hydrophone and the digitizer and locate the digitizer within the hydrophone housing. This configuration can improve the performance of the seismic source signature near-field hydrophones and exploit its full dynamic range. For example, an electronic circuit having a form factor suitable to contain a high resolution (e.g., 24 bit) analog-to-digital (A/D) converter, time synchronization, and digital transmission capability may be located within the housing or body of a near-field hydrophone.

SUMMARY

In one embodiment, a digital seismic source signature near-field hydrophone for use with air guns used as a source of seismic energy for marine seismic surveys is provided. The near-field hydrophone includes a housing, a piezoelectric element configured to produce an analog signal in response to an acoustic signal generated by the release of compressed air into water, an analog circuit coupled to the piezoelectric element, wherein the analog circuit is configured to receive the analog signal and to produce a conditioned analog signal, an analog-to-digital converter configured to receive the conditioned analog signal and to produce a digitized form of the conditioned analog signal, and a processor coupled to a memory circuit and to the analog-to-digital converter, wherein the processor is configured to control the operation of the analog-to-digital converter and to provide a digitized serial communication output corresponding to the digitized form of the conditioned analog signal. The piezoelectric element, the analog circuit, the analog-to-digital converter, the processor, and the memory circuit are located within the housing.

BRIEF DESCRIPTION OF THE DRAWINGS

The features and advantages of the various embodiments of the invention, and the manner of attaining them, will become more apparent and the embodiment of the invention itself will be better understood by reference to the following description of embodiments of the embodiment of the invention taken in conjunction with the accompanying drawings, wherein:

FIGS. 4A and 4B are diagrams showing an example marine air gun.

FIGS. 6A-1 through 6A-4 and 6B-1 through 6B-4 illustrate example implementations of the circuit illustrated in FIG. 5, according to one embodiment.

DESCRIPTION

Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims.

Reference throughout the specification to "various embodiments," "some embodiments," "one embodiment," or "an embodiment", or the like, means that a particular feature, structure, or characteristic described in connection with the embodiment is included in at least one embodiment.

Thus, appearances of the phrases "in various embodiments," "in some embodiments," "in one embodiment," or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Furthermore, it will be appreciated that for conciseness and clarity, spatial terms such as "vertical," "horizontal," "up," and "down", for example, may be used herein with respect to the illustrated embodiments. However, these terms are used to assist the reader and are not intended to be limiting and absolute.

Figure 1:
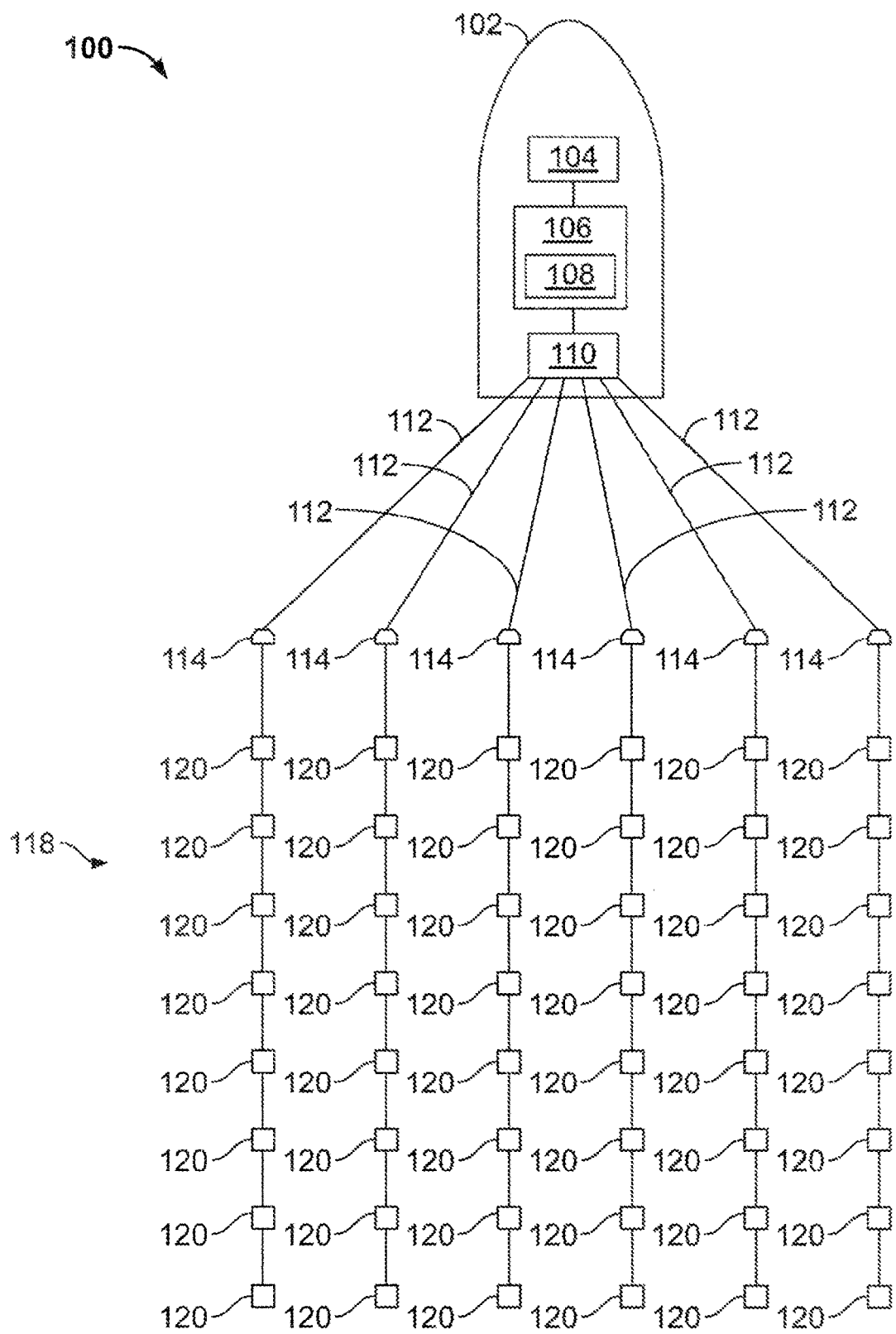
FIG. 1 is a block diagram showing an example marine seismic source system.

FIG. 1 is a block diagram showing an example marine seismic source system 100. The example system includes an array 118 of air gun clusters 120 towed by a vessel 102. Each cluster 120 may include one, two, three, or more marine air guns that generate an acoustic signal in the water. Different clusters may include different numbers of air guns. For example, some of the clusters 120 may each have a single air gun, while other clusters 120 may each include two or three air guns.

Each air gun houses its own digital electronic control circuitry. The electronic circuitry for an air gun may be carried in a sealed chamber defined by structures integral with the air gun body, structures attached to the air gun body, structures mounted on the air gun body, structures abutting the air gun body, and/or structures otherwise carried by the air gun body. In the example system 100, each air gun also houses transducers (e.g., depth transducers, pressure transducers, hydrophones, etc.) communicably coupled to the air gun's digital electronic circuitry. The digital electronic circuitry of each marine air gun can control operation of the marine air gun based on digital communications received from a command center 106, and/or the digital electronic circuitry can collect digitized data from the transducers. The digital electronic circuitry may store the data, and/or transmit the digital data back to the command center 106.

In some implementations, a dedicated point-to-point communication link between each marine air gun cluster 120 and the command center 106 allows the command center 106 to exchange digital communications with each marine air gun individually. For example, each marine air gun may transmit digital data to the command center 106 by modulating current on the dedicated communication link, and/or the command center 106 may transmit digital data to each marine air gun by modulating voltage on the dedicated communication link.

The electronic circuitry embedded in the marine air gun can tolerate the harsh working conditions of the marine air gun. For example, in a some seismic surveys, the marine air gun is submersed in salt water or fresh water, subject to marine turbulence, and jolted by seismic signals from the marine air gun. In some instances, the electronic components experience forces over one thousand times the force of gravity when the marine air gun generates the acoustic signal. The robust configuration of the electronics may sustain such conditions for reliable and continuous operation through several seismic surveys without interruption. In some cases, all or part of the electronic circuitry are integrated in one or more circuit boards or similar structures, and the integrated structure is secured in a chamber of the air gun by shock-absorbing material. The shock-absorbing material may have elastic properties that reduce wear or damage to the electronic circuitry components. Example shock-absorbing material include gels, epoxies, resins, potting materials, and others.

The electronic circuitry may be spatially compact to allow all or part of the electronic circuitry to be integrated directly into a housing of the air gun actuator (e.g., the solenoid valve housing), a sensor housing (e.g., the pressure transducer housing, etc.), or a different structure of the marine air gun. For example, the digital electronic circuitry can be integrated on a single circuit board that fits in a solenoid housing. By integrating the electronic circuitry into a common housing with an actuator or sensor of the marine air gun, the circuitry can communicably couple to the actuator or sensor without external connectors exposed to the water. For example, the electronic circuitry components can be electrically connected to the actuators and sensors of the marine air gun by surface-mount soldered connections within a common sealed chamber, which may reduce the number of external connectors. In addition to reducing exposure to water, the surface-mount soldered connections may provide a mechanically and electrically robust coupling among the electronic components and/or between the electronic components and the other air gun components (e.g., the solenoid, transducers, etc.).

In the example system 100, the vessel 102 tows an array 118 of air gun clusters 120. The vessel 102 includes a navigation center 104, a command center 106, and one or more reels 110. The vessel 102 may include an air supply (not shown) that provides pressurized air to the air guns in the array 118. An air supply may include a cylinder or chamber that store gas at high pressure, a pump that pressurize the gas, regulators that control gas pressure, valves that control gas flow, and/or other features. The pressurized air provided to the air guns is stored in one or more chambers in the pressure release assembly of the air gun and released by the pressure release assembly to generate the acoustic signal. The pressurized air may also be stored in one or more chambers in an actuator of the air gun and released by the actuator to actuate the pressure release assembly.

The pressurized or compressed air used by a marine seismic source system and/or by components of a marine seismic source system may include any type of compressible fluid. For example, the air supply on the vessel 102 may include supplies of helium, nitrogen, oxygen, carbon dioxide, argon, or any combination of these and/or other gases. For example, the compressed air communicated to the marine air guns and released by the marine air guns to generate the acoustic signal may include one or more of these example gases in any ratio or combination. Some marine air guns may also generate an acoustic signal by releasing non-compressible fluid. For example, in some instances a marine air gun releases water to generate an acoustic signal in water.

The vessel 102 may include a power supply that generates electrical power for operating one or more components of the system 100. A power supply may include a DC voltage supply that provides a constant voltage, an AC voltage supply that provides a time-varying voltage, and/or other types of power supply. The vessel 102 may include additional and/or different features.

Each air gun cluster 120 is coupled to an umbilical 112 extending from the reels 110. The umbilical 112 includes communication links supporting communications between the command center 106 and the air guns at each cluster 120. Each umbilical 112 includes a bell housing 114. The bell housing 114 may include a multiplexer that multiplexes and/or demultiplexes communications to and/or from the command center 106. The multiplexer may be mounted internal to the bell housing 114, external to the bell housing 114, and/or in another location.

The navigation center 104 navigates the vessel 102. The navigation center 104 may navigate the vessel 102 based on automated and/or manual control. For example, the navigation center 104 may be programmed to guide the vessel 102 through a trajectory specified for one or more seismic surveys. During a seismic survey, the navigation center 104 may navigate based on data stored locally on the vessel 102, based on global positioning system (GPS) data received by the vessel 102, based on data received wirelessly (e.g., via satellite, via radio frequency transmission, and/or another medium) from a remote location, and/or based on other types of information.

The navigation center 104 may communicate with the command center 106. For example, the navigation center 104 may send the command center 106 instructions to fire the air gun array 118, and/or the command center 106 may send the navigation center 104 information relating to the status of the air gun array 118 (e.g., location information, firing status information, etc.), which may include information relating to individual clusters 120, information relating to individual air guns in the array 118, and/or information relating to the array 118 as a whole.

The command center 106 operates the array 118 based on digital communications with the air guns in each cluster 120. The command center 106 includes a communication interface 108 that transmits digital data to and receives digital data from the air guns in the array 118. The command center 106 may include additional and/or different features. The command center 106 may include a computer system, for example, that includes processors running software for performing some or all of the functionality of the command center. The computer system may include memory that can store data received from and/or relating to operations of the air guns. The computer system may include display devices (e.g., monitors, etc.) that can display the data in various formats and/or user interface devices (e.g., keyboard, mouse, etc.) that receive user input. Generally, the command center 106 may receive, store, analyze, generate, and/or transmit data relating to the air gun array 118 and/or data relating to other aspects of a seismic survey. In some instances, some or all of the command center 106 computing operations and functionality may be performed at a remote location. The command center 106 may include a power supply that provides electrical power provided to the air gun array 118. The power supply may supply electrical energy at one or more voltage levels (e.g., 5 Volts, 10 Volts, 20 Volts, 40 Volts, 80 Volts, etc.). The command center 106 may control the level of electrical voltage and/or power provided to each air gun cluster 120.

The communication interface 108 transmits electrical power and commands and/or other information to the air gun(s) at each cluster 120. The commands may be based on data received from the navigation center 104, data stored or generated locally by the command center 106, data received from a remote location (e.g., remote from the vessel 102), and/or other data. The commands sent to the air guns may include various types of instructions for conducting a seismic survey. For example, the commands may include a fire command, instructions to prepare for a fire command, commands to reconfigure an air supply valve, requests for data, and/or other types of commands. The commands and/or other information sent from the communication interface 108 may be addressed to all air guns, to individual air guns, to individual air gun clusters 120, and/or to subsets of air guns. For example, the communication interface 108 may address a command to an individual air gun by transmitting an identifier with the command (e.g., as a header), where the identifier corresponds to the individual air gun. Each air gun may have a unique identifier. The commands may include digital communications in any digital communication format. For example, the digital communications may include asynchronous digital communications, synchronous digital communications, and/or other formats.

The communication interface 108 receives data and/or other types of information from the air gun(s) at each cluster 120. The data received from an air gun may include data collected by transducers located at the air gun, data generated by a digital controller at the air gun, digitized data received from the near-field hydrophone, and/or other data. The data received from an air gun may include various types of data relating to a seismic survey. For example, the information may include data from a one or more transducers associated with the air gun, data from a GPS receiver associated with the air gun, data relating to an air supply and/or air supply valves, various types of quality control data, timing signals, ready signals, data requested by the command center 106 and/or other types of data. The information received by the communication interface 108 may include an identifier that corresponds to the individual air gun that sent the information. The data received by the communication interface may include digital communications in any digital communication format. For example, the digital communications may include asynchronous digital communications, synchronous digital communications, and/or other formats.

In the example system 100, the reels 110 control the positions of the air gun clusters 120 by controlling the deployed length of each umbilical 112. The communication links in each umbilical 112 are communicably coupled to the communication interface 108. The communication links may be directly coupled to the communication interface 108, or the communication links may be indirectly coupled to the communication interface 108 through a network and/or connectors, which may include one or more communication links.

In some implementations, each umbilical 112 includes a communication link for each cluster 120. In the example shown, each umbilical 112 may include eight communication links, where each of the communication links is communicably coupled to the communication interface 108 and air gun(s) in a cluster 120. Each umbilical 112 may include one or more additional communication links. For example, each umbilical may include one or more backup communication links that can be used for troubleshooting purposes, backup purposes, supplemental communication and/or for communications with devices other than the air guns. In the example system, the communication link for each cluster 120 also provides electrical energy that powers the electronics at the cluster 120. In some implementations, each umbilical 112 may include a separate power link that provides power to the cluster 120 independent of communications. Each umbilical 112 may include an air supply line that provides pressurized air from an air supply on the vessel 102 to each air gun. Each umbilical 112 may include additional and/or different features. In some cases, the umbilical 112 does not include air supply, and one or more air supply lines run from the vessel 102 to each air gun cluster 120 separate from the umbilical 112.

In some implementations, each umbilical 112 includes a multiplexer at the bell housing 114 and a multiplexed communication link between the multiplexer and the communication interface 108. In such implementations, the communication interface 108 may also include a multiplexer that combines communications for multiple air gun clusters 120 onto a single multiplexed communication link. The multiplexer at the bell housing 114 on the umbilical 112 can demultiplex the data from the multiplexed link onto the separate communication links for each air gun cluster 120. As such, point-to-point communications between the command center 106 and each air gun cluster 120 may include multiplexed links that each support communication between the command center 106 and multiple air gun clusters 120 and dedicated (i.e., non-multiplexed) links that each support communications between the command center and an individual air gun cluster 120.

Figure 2A:
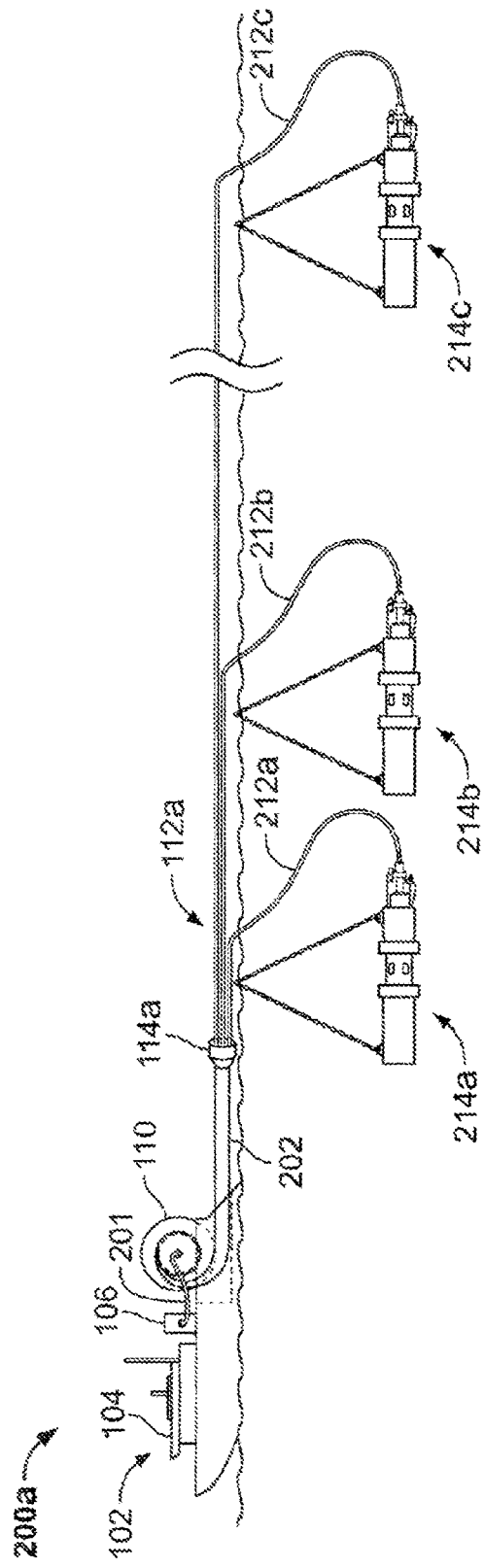
FIGS. 2A and 2B are schematic diagrams showing example marine seismic source systems.
Figure 2B:
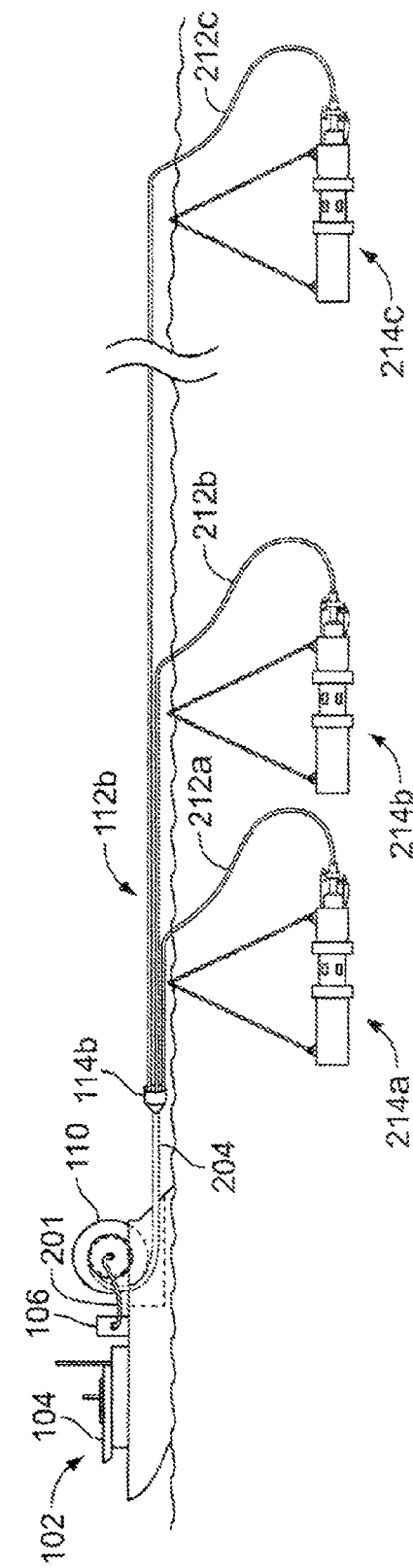

FIGS. 2A and 2B are diagrams showing example marine seismic source systems 200a, 200b. Although either system 200a, 200b may include an array having several strings of air gun clusters, only a single string is shown in each of FIGS. 2A and 2B. Three example air gun clusters 214a, 214b, 214c are shown, and each air gun cluster is shown as having a single air gun. Each of the systems 200a, 200b may include strings of air guns having greater or fewer than three clusters, and each cluster may include more than one air gun.

The example system 200a of FIG. 2A includes dedicated communication links for each air gun cluster. The umbilical 112a in FIG. 2A includes individual communication links 212a, 212b, 212c for each air gun cluster 214a, 214b, 214c. A first communication link 212a provides communications between the command center 106 and the first air gun cluster 214a; a second communication link 212b provides communications between the command center 106 and the second air gun cluster 214b; and a third communication link 212c provides communications between the command center 106 and the third air gun cluster 214c. Each communication link 212a, 212b, 212c extends from the reel 110 to an air gun cluster. As such, each communication link 212a, 212b, 212c extends through the portion 202 of the umbilical 112a nearest the vessel 102 (between the bell housing 114a and the reel 110), and the bell housing 114a does not utilize a multiplexer. In some implementations, each communication link 212a, 212b, 212c extends from the reel 110 to the command center 106. In some implementations, one or more different communication links 201 (which may or may not include a multiplexed link) communicably couples the communication links 212a, 212b, 212c to the command center 106 from the reel 110.

The example system 200b of FIG. 2B also includes dedicated communication links for each air gun cluster. As in FIG. 2A, the umbilical 112b in FIG. 2B includes individual communication links 212a, 212b, 212c for each air gun cluster 214a, 214b, 214c. The umbilical 112b in FIG. 2B includes a multiplexed link 204 between the reel 110 and the bell housing 114b. As such, each communication link 212a, 212b, 212c extends only between the bell housing 114b and one of the air gun clusters. The bell housing 114b includes a multiplexer that performs multiplexing and demultiplexing operations for converting data between the dedicated communication links 212a, 212b, 212c and the multiplexed link 204. In some implementations, multiplexed link 204 extends from the reel 110 to the command center 106. In some implementations, one or more different communication links 201 (which may or may not include a multiplexed link) communicably couples the multiplexed link 204 to the command center 106 from the reel 110.

Figure 3A:
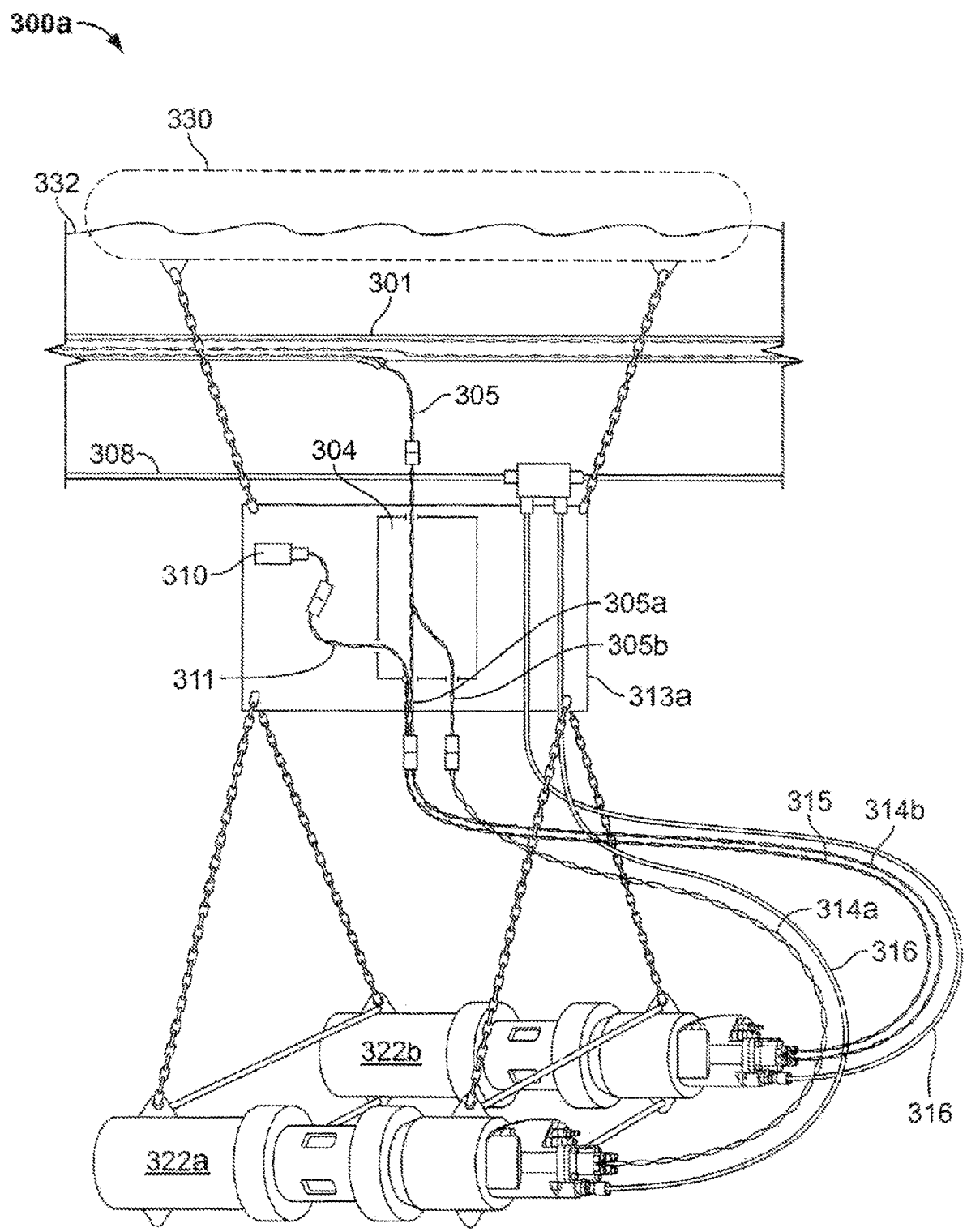
FIGS. 3A and 3B are diagrams showing example air gun clusters.
Figure 3B:
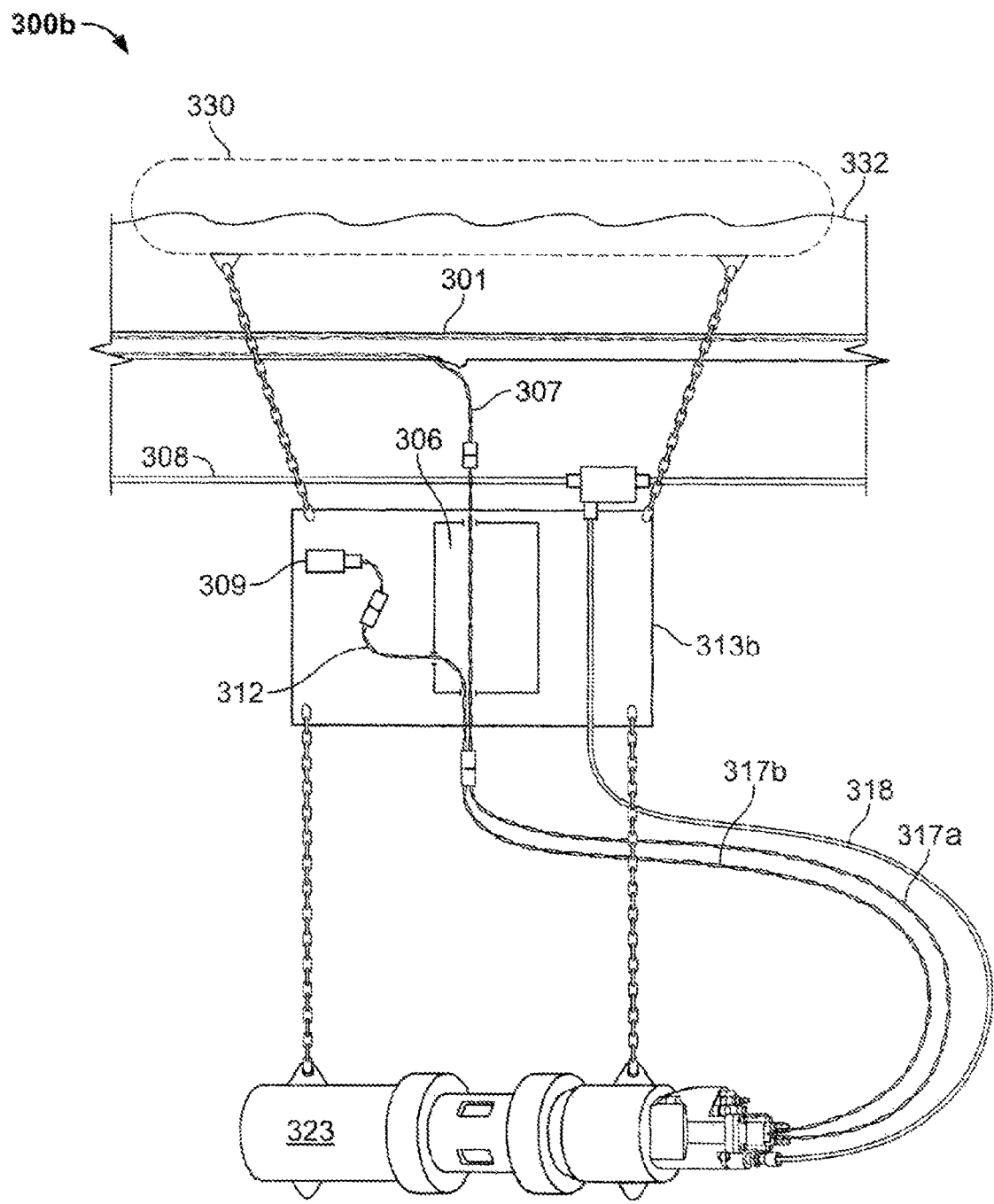

FIGS. 3A and 3B are diagrams showing example air gun clusters. The air gun clusters may be towed by a vessel (not shown). FIG. 3A shows an example cluster 300a with two marine air guns 322a, 322b. FIG. 3B shows an example cluster 300b with one marine air gun 323. In some implementations, a cluster may include more than two air guns. In some implementations, each of the clusters 120 of FIG. 1 can be implemented as the cluster 300a, the cluster 300b, and/or another type of air gun cluster. In some implementations, the systems 200a, 200b of FIG. 2 can include one or more of the clusters 300a, 300b, and/or different types of air gun clusters.

The cluster 300a shown in FIG. 3A includes a hanger plate 313a submersed in water, the two air guns 322a, 322b submersed in water, and a flotation device 330 at the water surface 332. The cluster 300a may include additional and/or different features. The flotation device 330 floats at the water surface 332 and suspends that hanger plate 313a. The hanger plate 313a suspends the air guns 322a, 322b at a depth below the hanger plate 313a. Chains, cables, and/or other suitable structures may be used to suspend the hanger plate 313a and/or the air guns 322a, 322b at a desired depth. For example, the air guns 322a, 322b may be deployed at a depth of twenty feet, thirty feet, or another depth below the water surface 332. The components of the cluster 300a may be arranged in a different configuration. In some instances, the air guns 322a, 322b may be suspended from the floatation device 330, and the hanger plate 313a can be suspended from the air guns 322a, 322b at a depth below the air guns 322a, 322b. The air guns 322a, 322b may be suspended at the same depth below the water surface 332 or at different depths.

Two air supply lines 316 extend from a main air supply line 308 to the hanger plate 313a. Each of the air supply lines 316 extends from the hanger plate 313a to one of the air guns 322a, 322b. The air supply lines 316 provide pressurized air to the air guns. The hanger plate 313a and/or the air guns 322a, 322b may include one or more valves (not shown) that control the flow of air through the supply lines 316. The main air supply line 308 may provide pressurized air to one or more additional clusters in an air gun array. The main air supply line 308 may receive air from an air supply on a vessel that tows the cluster 300a.

The air guns 322a, 322b receive the pressurized air from the air supply lines 316 and store the air at high pressure in a chamber in the air gun. When actuated by an actuator (e.g., a solenoid valve), a pressure release assembly of each air gun 322a, 322b can release the compressed air to generate an acoustic signal in the water. The actuator (e.g., a solenoid valve) of the air guns 322a, 322b may also receive the pressurized air from the air supply lines 316 and store the air at high pressure in a chamber of the actuator. The actuator can use the compressed air to pneumatically actuate the pressure release assembly in response to an electrical signal (e.g., a voltage signal) received by the actuator. Digital electronic circuitry housed at each air gun 322a, 322b may control the electrical signal applied to the actuator of the air gun to control the pressure release. The digital control electronics at each air gun 322a, 322b may control the air gun based on digital communications received from a command center (e.g., the command center 106 of FIG. 1). The digital electronic circuitry housed at each air gun 322a, 322b, receives digitized seismic signals information from a seismic source signature near-field hydrophone comprising an electronic circuit having a high resolution (e.g., 24 bit) analog-to-digital converter (ADC), time synchronization, and digital transmission circuitry located within the housing or body of a near-field hydrophone.

The cluster 300a includes several communication links 305, 305a, 305b, 311, 314a, 314b, 315 and others. The communication links 305, 305a, 305b, 314a, 314b, 315 may transmit digital communications from the command center to each air gun 322a, 322b and/or from each air gun 322a, 322b to the command center. In the example shown, each of the communication links 305, 305a, 305b, 311, 314a, 314b, 315, is implemented as a single twisted pair. A twisted pair includes a pair of conducting wires that are twisted around each other along all or part of the length of the conducting wires. Additional and/or different types of communication link may be used. For example, one or more of the communication links 305, 305a, 305b, 311, 314a, 314b, 315 may include one or more twisted pairs, fiber optic cables, coaxial cables, and/or different types of communication links.

The communication link 305 provides power and communications to the cluster 300a and transmits data from the cluster 300a. The communication link 305 extends to the hanger plate 313a from an umbilical 301. The umbilical 301 extends to one or more additional clusters in an air gun array. In addition to the communication link 305, the umbilical 301 includes additional communication links that provide power and communications to the other clusters in an air gun array. Each additional communication link in the umbilical 301 may be implemented with a twisted pair and/or with additional or different types of communication links. The umbilical 301 may extend to a vessel that tows the cluster 300a and/or to a bell housing towed behind the vessel.

The hanger plate 313a includes a splitter 304. The splitter 304 splits the signal from the communication link 305 into two communication links 305a, 305b. The communication links 305a, 305b may each receive identical signals from the communication link 305 through the splitter 304. When the air guns 322a, 322b transmit data, the splitter 304 transfers signals from the communication links 305a, 305b to the communication link 305. The communication links 305a, 305b are communicably coupled (e.g., by a connector or another type of coupling) to the communication links 314a, 314b, which each extend through the water to one of the air guns 322a, 322b. The cluster 300a may include additional, different, or fewer communication links. For example, in some implementations, the communication links 305a, 305b may extend through the water to the air guns 322a, 322b without coupling to communication links 314a, 314b.

The air gun 322a houses digital electronic circuitry communicably coupled to the communication link 314a, and the air gun 322b houses digital electronic circuitry communicably coupled to the communication link 314b. The digital electronic circuitry in each air gun 322a, 322b may be housed in a structure that is integral with, mounted on, and/or otherwise carried by the pressure release assembly of the air gun. The digital electronic circuitry at each air gun 322a, 322b may control operation of the air gun, for example, by electrically controlling a mechanical or pneumatic actuator that actuates the pressure release assembly. The digital electronic circuitry at each air gun 322a, 322b may control operation of the air gun based on digital communications received at the air gun from the command center (e.g., the command center 106 of FIG. 1).

Each air gun 322a, 322b may also house transducers communicably coupled to the digital electronic circuitry communicably in the air gun. The transducers in each air gun 322a, 322b may be housed in a structure that is integral with, mounted on, and/or otherwise carried by the pressure release assembly of the air gun. The transducers may include pressure transducers, depth transducers, a zero-field hydrophone, and/or other types of transducers. The transducers may generate electrical signals based on detecting mechanical, acoustic, pneumatic, and/or other types of conditions in or about the air gun. The transducers may transmit analog data to the digital electronic circuitry housed at the air gun, and the digital electronic circuitry may digitize and store the data. The digital electronic circuitry in the air guns may transmit the digitized transducer data to the command center through the respective communication links 314a, 314b, 305a, 305b, and 305.

Each air gun 322a, 322b includes connectors that couple to the communication links and to the pressurized air supply lines. The connectors may include electrical couplings, optical couplings, mechanical couplings, pneumatic couplings, and/or other types of couplings. For example, the connectors may include bolts, screws, threading, and/or other types of fasteners that mechanically secure an external cable, wire, tube, conduit, or other type of structure to the connector. As another example, the connectors may include copper and/or other types of metallic fittings that provide conductive coupling for power and/or communications. As another example, the connectors may include sealed pneumatic fittings for the pressurized air supply line.

The hanger plate 313a includes a near field hydrophone 310. The near-field hydrophone 310 collects acoustic data. The near-field hydrophone may be positioned equidistant (or substantially equidistant) from the two air guns 322a, 322b, such that when the air guns 322a, 322b are fired they appear acoustically to the near-field hydrophone 310 as a point source. The near-field hydrophone 310 includes an acoustic transducer that converts acoustic signals to electrical signals. The near-field hydrophone 310 also includes a high resolution (e.g., 24 bit) analog-to-digital converter (ADC), time synchronization, and digital transmission circuitry located within the housing or body of the near-field hydrophone 310. In the example shown, the near-field hydrophone 310 is communicably coupled to the digital electronic circuitry in the air gun 322b by a first communication link 311 in the hanger plate 313a and a second communication link 315 that extends between the hanger plate 313a and the air gun 322b. The near-field hydrophone 310 may transmit digital data to the air gun over the communication links 311, 315, and the digital electronic circuitry in the air gun 322b may store the data from the near-field hydrophone 310. The digital electronic circuitry in the air gun 322b may transmit the digitized near-field hydrophone data to the command center through the communication links 314b, 305a, and 305. Digital data from the near-field hydrophone 310 may be useful for data analysis, quality control, and/or trouble shooting. For example, digital data from the near-field hydrophone 310 may indicate the magnitude, frequency, duration, timing, and/or other properties of the seismic signal generated by the cluster 300a. In some instances, digital data from the near-field hydrophone 310 may be used to detect air leaks in the supply lines and/or in the air guns in the cluster 300a.

In addition to the near-field hydrophone 310, the hanger plate 313a and/or a different structure in the cluster 300a may include auxiliary devices that receive power and/or communications from the communication link 305. For example, the cluster 300a may include a GPS device, air supply valves, and/or other types of auxiliary devices that receive power and/or communications from the communication link 305.

The cluster 300b shown in FIG. 3B includes a hanger plate 313b submersed in water, the air guns 323 submersed in water, and a flotation device 330 at the water surface 332. The cluster 300b may include additional and/or different features. The flotation device 330 floats at the water surface 332 and suspends that hangar plate 313b. The hanger plate 313b suspends the air gun 323 at a depth below the hanger plate 313b. Chains, cables, and/or other suitable structures may be used to suspend the hanger plate 313b and/or the air gun 323. The components of the cluster 300a may be arranged in a different configuration. In some instances, the air gun 323 may be suspended from the floatation device 330, and the hanger plate 313b can be suspended from the air gun 323 at a depth below the air gun 323.

An air supply line 318 extends from the main air supply line 308 to the hanger plate 313b and from the hanger plate 313b to the air gun 323. The air supply line 318 provides pressurized air to the air gun 323. The hanger plate 313b and/or the air gun 323 may include one or more valves (not shown) that control the flow of air through the supply line 318. The air gun 323 may be configured and/or operate in the same manner as the air gun 322a of the cluster 300a in FIG. 3A. For example, the air gun 323 can receive the pressurized air from the air supply line 318, store the air at high pressure in a chamber in the air gun 323, and release the compressed air to generate an acoustic signal in the water. The air gun 323 may include the same actuator, digital electronics, and transducers as the air gun 322a in FIG. 3A, which may operate as described with respect to the air gun 322a.

The cluster 300b includes several communication links 307, 317a, 317b, and others. The communication links 307 and 317a may transmit digital communications from the command center to the air gun 323 and/or from the air gun 323 to the command center. In the example shown, each of the communication links 307, 317a, 317b is implemented as a single twisted pair. Additional and/or different types of communication link may be used. The communication link 307 provides power and communications to the cluster 300b and transmits data from the cluster 300b. The communication link 307 extends to the hanger plate 313b from an umbilical 301.

The hanger plate 313b may include a splitter 306. The communication link 307 is communicably coupled (e.g., by a connector or another type of coupling) to the communication link 317a, which extends through the water to the air gun 323. The cluster 300b may include additional, different, or fewer communication links. For example, in some implementations, the communication link 307 may extend through the water to the air gun 323 without coupling to communication link 317a.

The hanger plate 313b includes a near-field hydrophone 309. The near-field hydrophone 309 may be configured and/or operate as the near-field hydrophone 310 of FIG. 3A. In the example shown in FIG. 3B, the near-field hydrophone 309 is communicably coupled to the digital electronic circuitry in the air gun 323 by a first communication link 312 in the hanger plate 313b and a second communication link 317b that extends between the hanger plate 313b and the air gun 323. The digital electronic circuitry in the air gun 323 may receive digital data from the digital circuitry in the near-field hydrophone 309, store the digitized data, and transmit the digitized data to the command center through the communication links 317a, 307.

FIGS. 4A and 4B are diagrams showing an example marine air gun 400. In some implementations, the marine air guns 322a, 322b of FIG. 3A and/or the marine air gun 323 of FIG. 3B may be implemented as the marine air gun 400. The marine air gun 400 includes a pressure release assembly 404 and a control housing 402 carried on the end of the pressure release assembly 404. The pressure release assembly 404 includes a housing 405 that defines ports 406. Within the housing 405, the pressure release assembly 404 defines a pressure chamber that stores compressed air. The pressure release assembly 404 includes a partition that prevents fluid communication between the pressure chamber and the ports 406. The partition is moveable to permit fluid communication between the pressure chamber and the ports 406. The partition may be part of a valve, a piston, or another type of structure that moves the partition when the pressure release assembly is actuated. The surge of compressed fluid from the pressure chamber through the ports 406 generates an acoustic signal that propagates through the water.

Figure 5:
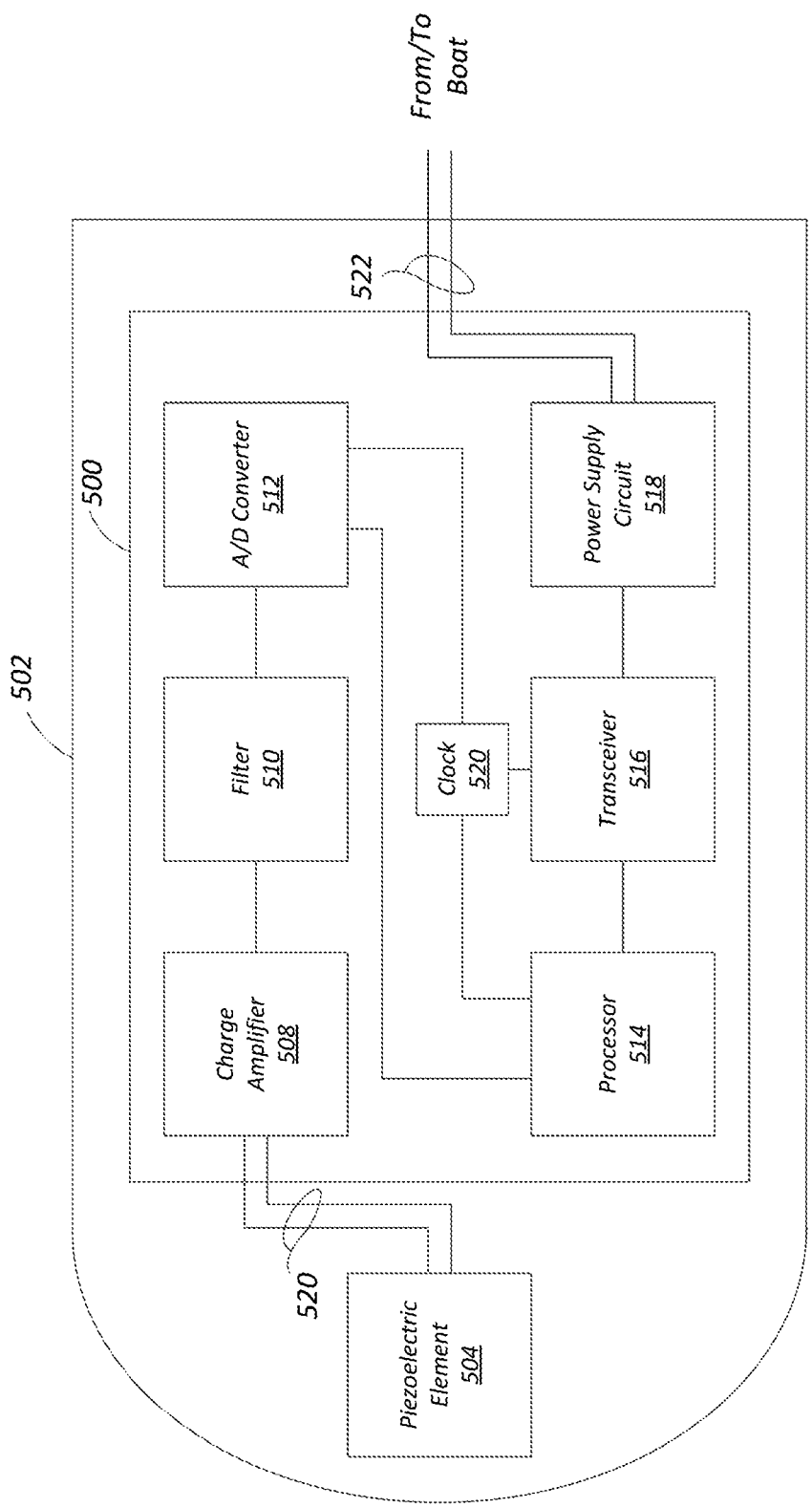
FIG. 5 is an illustration of a block diagram of a digital near-field hydrophone comprising a circuit configured to condition and digitize signals, according to one embodiment.

FIG. 5 is an illustration of a block diagram of a digital near-field hydrophone 502 comprising a circuit 500 configured to condition and digitize signals, according to one embodiment. A piezoelectric element 504 is disposed on one end of the digital near-field hydrophone 502. The piezoelectric element 504 responds to sound pressure and produces an analog signal output which is coupled to a charge amplifier 508 through a twisted pair 520 of conductors, for example. The output of the charge amplifier 508 is provided to a filter 510. The output of the filter 510 is provided to the analog input of an A/D converter 512. The digitized output of the A/D converter 512 is provided to a processor 514, which controls the operation of the circuit 500. The serial output of the processor 514 is provided to a transceiver 516, which is coupled to a power supply circuit 518. The power and communication signals are provided on the same twisted pair 522 of conductors. The power to operate the circuit 500 and the piezoelectric element 504 is received through the twisted pair 522 from the boat or other peripheral device and the communication output of the transceiver 516 is coupled to the same twisted pair 522. Thus, the communication output of the transceiver 516 is transmitted to the boat or other peripheral device through the same twisted pair 522.

Figures 1, 6A:
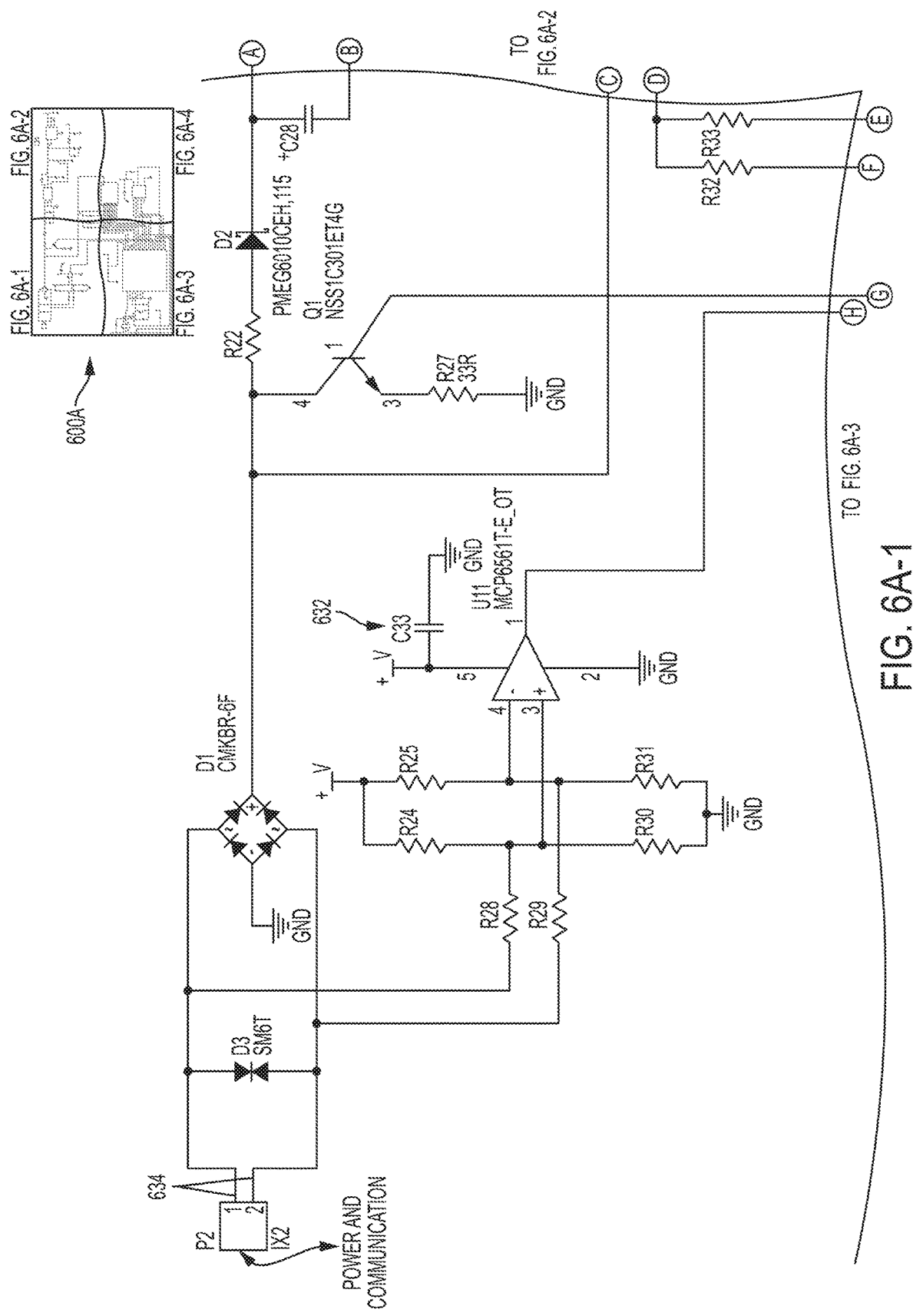
Figures 2, 6A:
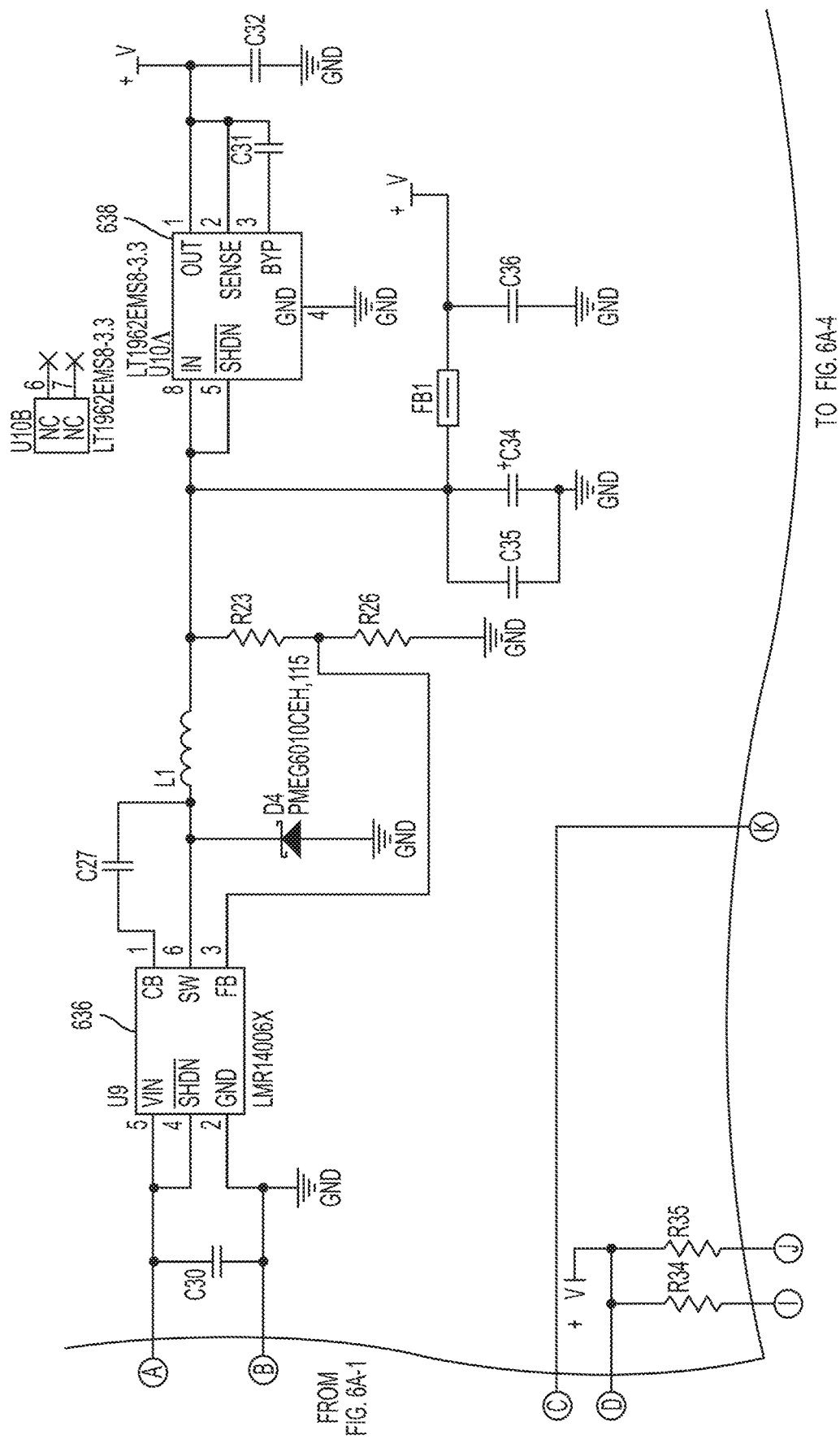
Figures 1, 6B:
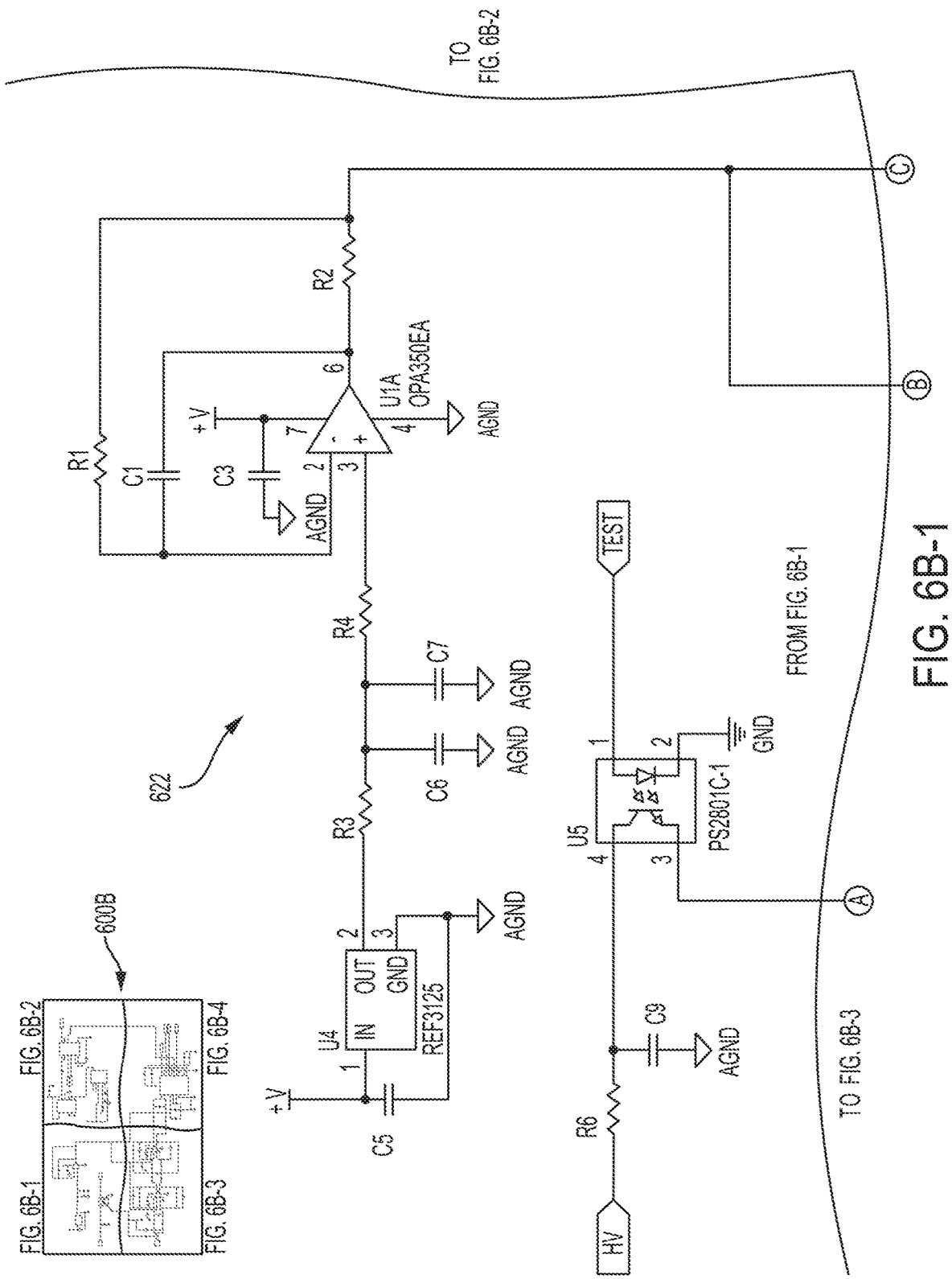
Figures 2, 6B:
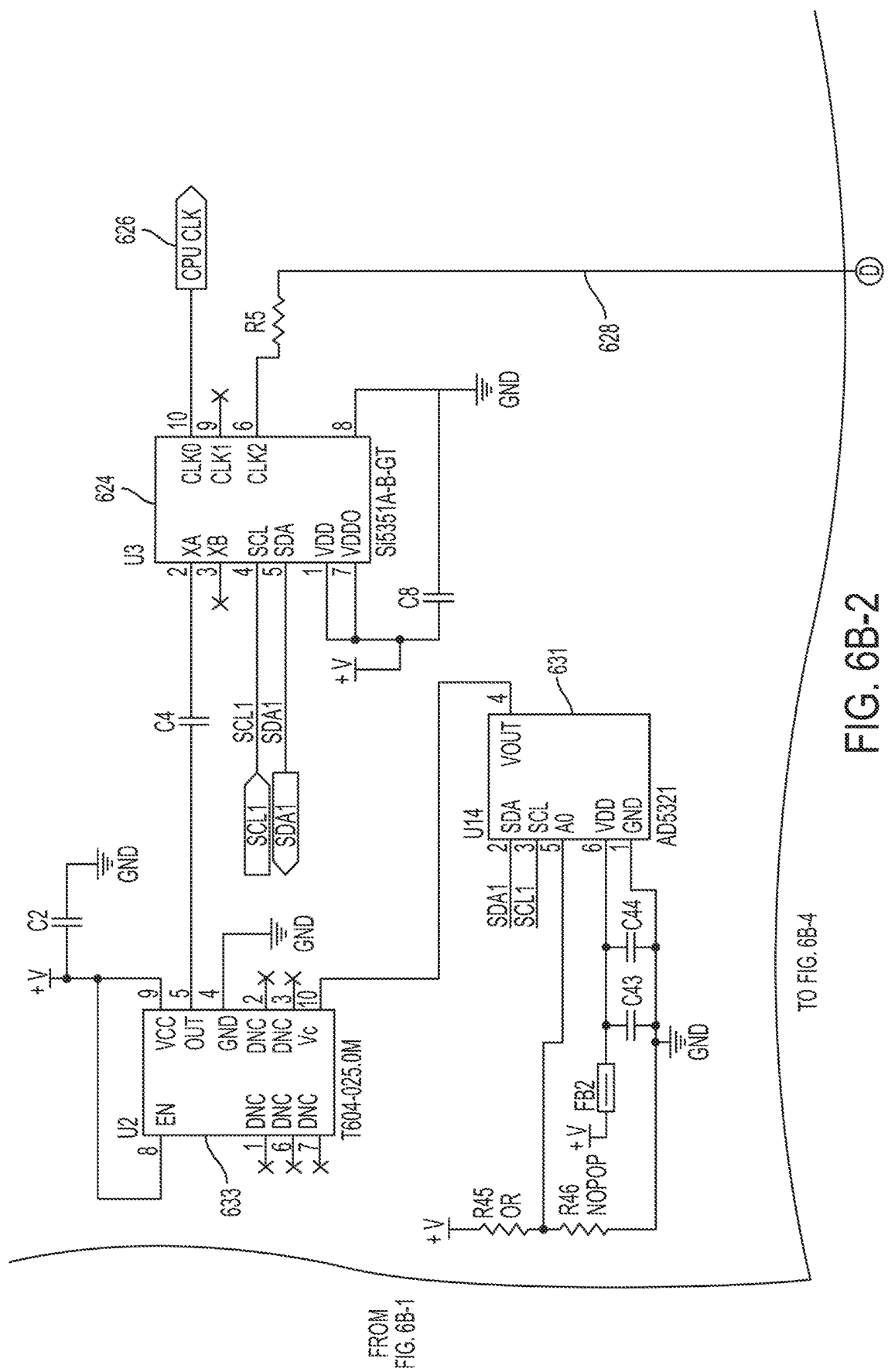
Figures 3, 6B:
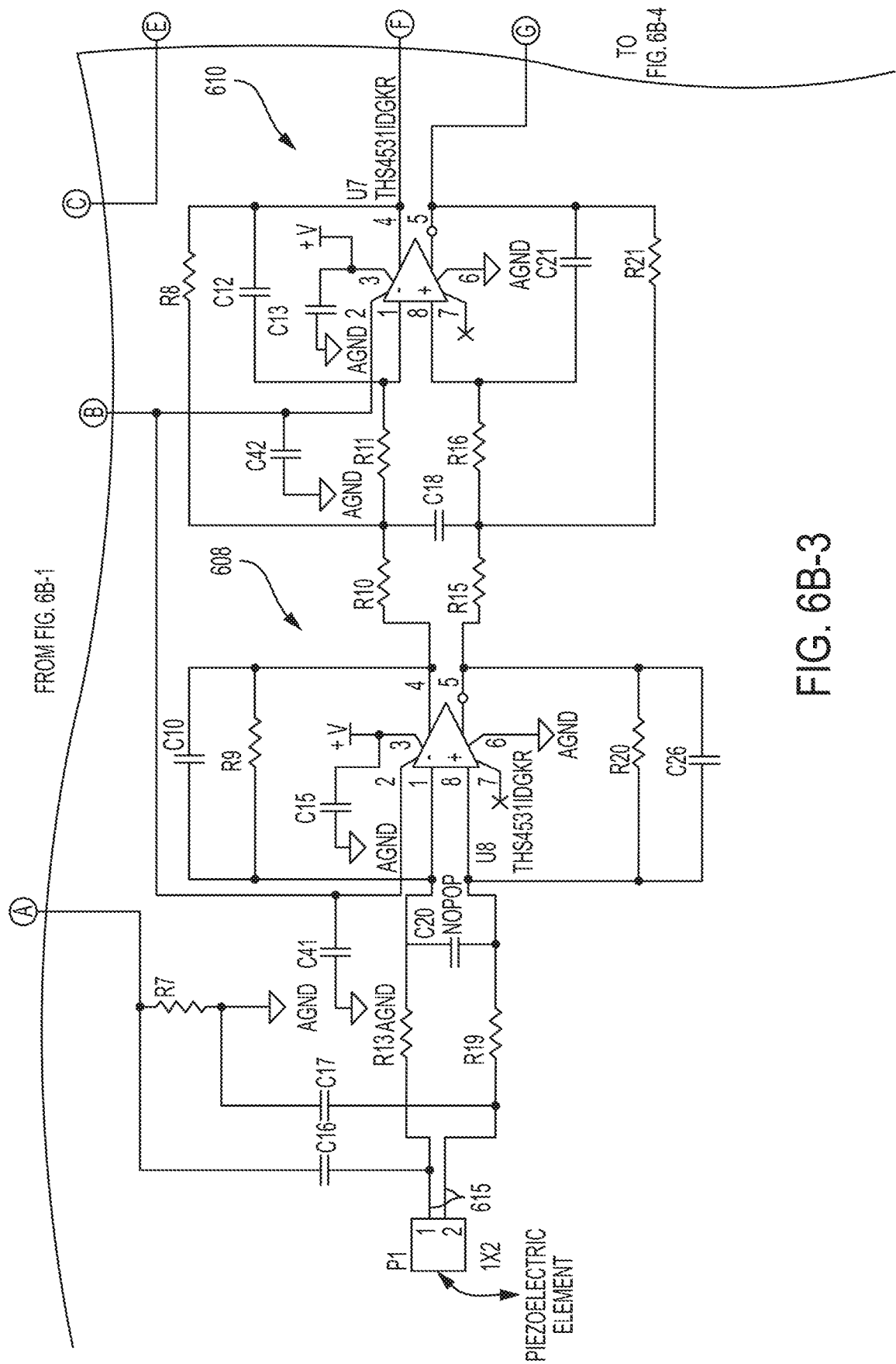
Figures 4, 6B:
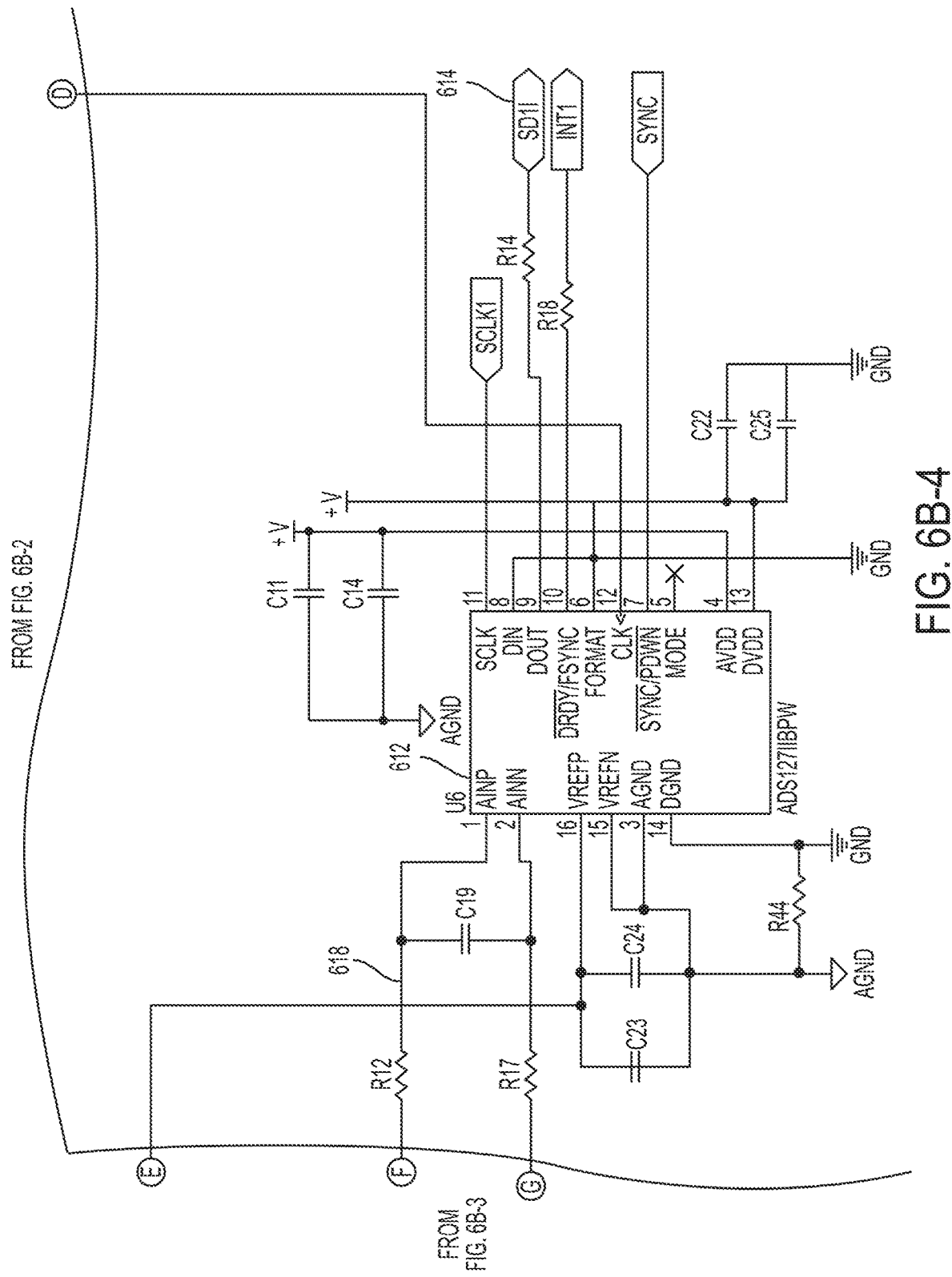

FIGS. 6A-1 through 6A-4 and 6B-1 through 6B-4 illustrate example implementations of the circuit 500 illustrated in FIG. 5, according to one embodiment. FIGS. 6A-1 through 6A-4 is illustrate a first portion 600A (See FIG. 6A-1) of a circuit comprising a microprocessor 602 (FIG. 6A-3) and a digital transceiver circuit 604 (FIG. 6A-4) to send/receive data over a twisted pair of wires 634 (FIG. 6A-1), and which coordinate the functions of the circuit 600A, according to one embodiment. As shown in FIG. 6A-1, both power and communications are provided on the same twisted pair 634. The power signal is coupled into a step down buck converter circuit 636 (FIG. 6A-2) and its output is applied to a low dropout voltage regulator circuit 638 (FIG. 6A-2), which provides a DC power supply for the digital circuitry.

The microprocessor 602 controls the operation of the digital circuitry such as the A/D converter 612 (FIG. 6B-4) and the transceiver circuit 604, which transmits the digitized output 606 (FIG. 6A-4) over the twisted pair 634. A comparator 632 (FIG. 6A-1) coupled between the twisted pair 634 input communications to the microprocessor 602. A memory 630 (FIG. 6A-4) also is coupled to the microprocessor 602. In one embodiment, the microprocessor 602 may be a PIC24FJ64GA002 general purpose 16-bit flash microcontroller. In one embodiment, the memory 630 may be a serial SRAM.

FIGS. 6B-1 through 6B 4 illustrate a second portion 600B (See FIG. 6B-1) of a circuit comprising signal conditioning and digitizing circuitry, in accordance with one embodiment. An analog input signal is received through a twisted pair 615 (FIG. 6B-3) from a piezoelectric element located within the housing of the digital near-field hydrophone. The analog signal is coupled to an analog buffer amplifier, which is coupled to a 24 bit A/D convertor 612 (FIG. 6B-4) capable of sampling analog signals at up to 10,000 samples per second. An oscillator circuit 624 (FIG. 6B-2), which can be adjusted to less than 1 ppm accuracy, also is provided. A first-stage comprises a charge amplifier 608 (FIG. 6B-3) coupled to the twisted pair 615 to receive the analog input signal from the piezoelectric element located within the housing of the digital near-field hydrophone. The path that comes into the wires is an unknown, so even though the near-field hydrophone has a calibration number, the path is unknown due to the variable length of the cable. In the illustrated circuit 600B, the piezoelectric element is electrically coupled to the charge amplifier 608 via the twisted pair 615 such that the serial digital output 614 (FIG. 6B-4) data can be calibrated exactly. Because the charge amplifier 608 is intimately nestled to the piezoelectric element itself, the charge amplifier 608 can be absolutely calibrated to account for all variables.

The output of the charge amplifier 608 is coupled to the input of a second-stage, which is a filter 610 (FIG. 6B-3) comprising high-pass and low-pass filter elements as well as buffering elements before coupling the analog signal 618 (FIG. 6B-4) to an input of the A/D converter 612. In one embodiment, the A/D converter 612 may be implemented as a 24-bit sigma delta A/D converters. In one embodiment, the A/D converter 612 may be an ADS12711BPW 24-bit, 105kSPS delta-sigma analog-to-digital converter. Any suitable A/D converter may be used. For example, in one embodiment, the A/D converter 612 can have dynamic ranges as high as 140 dB, but at a slower sample rate. In one embodiment, the required sampling rate may be about 10 kHz, which reduces the dynamic range slightly to about 120 dB. The embodiments, however, are not limited in this context and other A/D converters may be employed, for different sampling rates and dynamic ranges. The serial digital output 614 of the A/D converter 612 is applied to the transceiver circuit 604 (FIG. 6A-4).

The piezoelectric elements can detect signals from about 1 Hz to about 300-400 Hz and sometimes as high as 1 kHz. Accordingly, the analog signal from the piezoelectric element received at the input of the charge amplifier 608 has a frequency range of about 1 Hz to about 1 kHz.

A voltage reference circuit 622 (FIG. 6B-1) provides a voltage reference for the A/D converter 612 as well as the charge amplifier 608 and filter 610. An ultra low jitter crystal oscillator 624 is coupled to a crystal 633 (FIG. 6B-2) to generate a clock signal 626 (FIG. 6B-2) that can be adjusted to less than 1 ppm accuracy. One clock signal 626 is applied to the microprocessor 602 and another clock signal 628 (FIG. 6B-2) is applied to the A/D converter 612. A buffered voltage output digital-to-analog converter 631 FIG. 6B-2) applies a voltage to the crystal 633.

Figure 7:
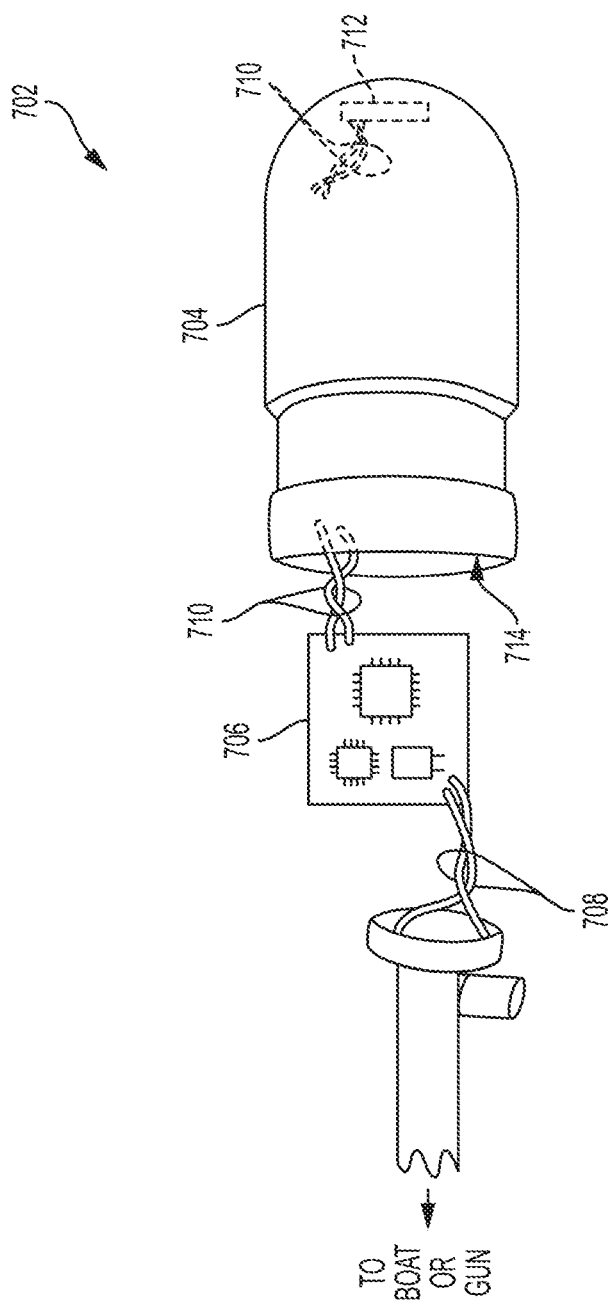
FIG. 7 is an illustration of a digitized near-field hydrophone comprising a circuit board sized to be mounted inside a housing of a near-field hydrophone, according to one embodiment.

FIG. 7 is an illustration of a digitized near-field hydrophone 702 comprising a circuit board 706 sized to be mounted inside a housing 704 of a near-field hydrophone 702, according to one embodiment. The circuit board 706 includes analog and digital circuitry and described in connection with the circuit 500 illustrated in FIG. 5 and the circuits 600A, 600B illustrated in FIGS. 6A-1 through 6A-4 and 6B-1 through 6B-4. The near-field hydrophone 702 has a generally cylindrical form which ends in a dome or helmet-like structure. The circuit board 706 is positioned behind the over-molded piezoelectric element within the cylindrical portion of the housing 704 and is then potted inside the housing 704. The near-field hydrophone 702 is about 1"-1.5" in diameter and about 2"-3" long.

The circuit board 706 is configured to mount inside a cavity 714 provided in the housing 704 near-field hydrophone 702. The circuit board 706, which comprises analog and digital electronic circuits, as shown in FIGS. 5, 6A-1 through 6A-4, and 6B-1 through 6B-4, for example, is located inside the housing 704 of the near-field hydrophone 702 to perform inside the near-field hydrophone 702 the digitization function that was previously performed either in the boat, in modules in and around the air gun, or inside the air gun itself. Accordingly, the digitization function has been moved to the digital circuitry 500, 600A, 600B as shown in FIGS. 5, 6A-1 through 6A-4, 6B-1 through 6B-4 located inside the near-field hydrophone 702 itself, which provides much better noise characteristics, much cleaner signal, and tighter timing.

Inside the housing 704 portion of the near-field hydrophone 702, inside the dome section there is typically a piezoelectric element 712. The piezoelectric element 712 is positioned within the dome ("helmet") portion of the housing 704 of the digital near-field hydrophone 702 and is over-molded in place. The compression on the piezoelectric element 712 creates an analog voltage signal in response to sound pressure that can be measured. The analog voltage signal is then conditioned by the analog circuitry such as the charge amplifier 508 and filter 510 circuits and then digitized by the A/D converter 512 (all shown in FIG. 5) or charge amplifier 608, filter 610, and A/D converter 612 (shown in FIGS. 6B-3 and 6B-4) located inside the near-field hydrophone 702.

The recording system comprises a plurality of hydrophones and near-field hydrophones. The near-field hydrophone 702 is mounted close to the air gun itself to monitor the sound, the sound source, that coming is out of the gun. A subtle distinction is that the digitizing is done inside the "near-field" hydrophone 702.

A twisted pair 708 of conductive wires come out of the near-field hydrophone 702. Accordingly, both power and communications are provided on the same twisted pair 708. It will be appreciated that the present disclosure is not limited to this approach. Also, generally speaking, the disclosed embodiments are not limited to any particular communication or powering scheme. Accordingly, a different protocol can be accommodated in the particular architecture.

In accordance with the disclosed embodiment, the near-field hydrophone 702 is located anywhere from about two to about six meters under water so. In one embodiment, the twisted pair 708 wired connection scheme provides two wires all the way out from the boat, all the way out to what is called the "gun cluster," which can either one or two guns mounted side-by-side and then to the hydrophone up about a meter between them. And so we have just two wires that come to that and then they T-off or Y-off to the two guns and to the hydrophone 702, with the same physical signal pairing, where it is split off.

At the gun cluster, out in the water, which can be anywhere from a hundred meters to a kilometer out and away from the boat, there is provided a termination or "splitter," and the two wires (twisted pair) are split into three separate twisted pairs that carry the same signal. The first twisted pair is coupled to one of the Smart Source modules, the second twisted pair is coupled to the other gun, and the third twisted pair is coupled to digital near-field hydrophone 702. The output of the A/D converter 512 (FIG. 5), or 612 (FIG. 6B-4) is a serial digital output which is transmitted over the same twisted pair 708 from the near-field hydrophone 702 circuit board 706.

EXAMPLES

Example 1

A near-field hydrophone comprising a housing, a piezoelectric element configured to produce an analog signal in response to an acoustic signal generated by the release of compressed air into water, an analog circuit coupled to the piezoelectric element, wherein the analog circuit is configured to receive the analog signal and to produce a conditioned analog signal, an analog-to-digital converter configured to receive the conditioned analog signal and to produce a digitized form of the conditioned analog signal, and a processor coupled to a memory circuit and to the analog-to-digital converter, wherein the processor is configured to control the operation of the analog-to-digital converter and to provide a digitized serial communication output corresponding to the digitized form of the conditioned analog signal, wherein the piezoelectric element, the analog circuit, the analog-to-digital converter, the processor, and the memory circuit are located within the housing.

Example 2

The hydrophone of Example 1, wherein the analog circuit comprises a charge amplifier and a filter circuit to produce the conditioned analog signal.

Example 3

The hydrophone of Examples 1 or 2, further comprising a transceiver coupled to the processor, wherein the transceiver is configured to receive the digitized serial communication and transmit the digitized serial communication over a communication link.

Example 4

The hydrophone of Example 3, wherein the communication link comprises a twisted pair of conductors, fiber optic cables, coaxial cables, or a combination thereof.

Example 5

The hydrophone of Examples 3 or 4, wherein the transceiver is further coupled to a power supply circuit, and wherein the power supply circuit is configured to receive power through the communication link.

Example 6

The hydrophone of Examples 1 or 2 or 3 or 4 or 5, wherein the housing comprises a cylindrical portion and a domed end portion, and wherein the piezoelectric element is positioned at the domed end portion.

Example 7

The hydrophone of Examples 1 or 2 or 3 or 4 or 5 or 6, wherein the housing is attached to an air gun cluster comprising at least one air gun, and wherein the at least one air gun releases the compressed air into the water.

Example 8

The hydrophone of Example 7, wherein the air gun cluster comprises at least two air guns, and wherein the housing is attached to the air gun cluster equidistant from the at least two air guns.

Example 9

A digital near-field hydrophone comprising a housing, a communication link, a piezoelectric element located within the housing, wherein the piezoelectric element is configured to produce an analog voltage signal in response to an acoustic signal generated by the release of compressed air into water, and a circuit located within the housing, wherein the circuit comprises a first circuit portion configured to condition and digitize the analog voltage signal, and a second circuit portion configured to supply power provided on the communication link to the circuit and to coordinate communications through the communication link.

Example 10

The hydrophone of Example 9, wherein the first circuit portion comprises a charge amplifier to receive the analog voltage signal from the piezoelectric element and to produce an amplified analog voltage signal, a filter circuit including a high-pass filter element, a low-pass filter element and a buffering element to condition the amplified analog voltage signal, and an analog-to-digital converter to receive the conditioned, amplified analog voltage signal and to produce a digital output signal.

Example 11

The hydrophone of Example 10, wherein the analog-to-digital converter comprises a 24 bit analog-to-digital converter.

Example 12

The hydrophone of Examples 10 or 11, wherein the analog-to-digital converter comprises a dynamic range of about 120 dB and a sampling rate of about 10 kHz.

Example 13

The hydrophone of Examples 9 or 10 or 11 or 12, wherein the second circuit portion comprises a microprocessor to control the operations of the circuit, a transceiver circuit to send the digital output signal through the communication link, an oscillator circuit to generate clock signals for the microprocessor and the analog-to-digital converter, and a power circuit to convert and regulate power provided on the communication link to supply direct current power to the circuit.

Example 14

The hydrophone of Examples 9 or 10 or 11 or 12 or 13, wherein the communication link comprises a twisted pair of conductors, fiber optic cables, coaxial cables, or a combination thereof.

Example 15

The hydrophone of Examples 9 or 10 or 11 or 12 or 13 or 14, wherein the housing is attached to an air gun cluster comprising at least one air gun, and wherein the at least one air gun releases the compressed air into the water.

Example 16

The hydrophone of Example 15, wherein the air gun cluster comprises at least two air guns, and wherein the housing is attached to the air gun cluster equidistant from the at least two air guns.

Example 17

The hydrophone of Examples 9 or 10 or 11 or 12 or 13 or 14 or 15 or 16, wherein the housing comprises a cylindrical portion and a domed end portion, wherein the cylindrical portion is about 1" to about 1.5" in diameter, and wherein the housing is about 2" to about 3" long.

Example 18

A hydrophone system comprising: (i) a hydrophone comprising a housing, a piezoelectric element configured to produce an analog signal in response to an acoustic signal generated by the release of compressed air into water, an analog circuit coupled to the piezoelectric element, wherein the analog circuit is configured to receive the analog signal and to produce a conditioned analog signal, an analog-to-digital converter configured to receive the conditioned analog signal and to produce a digitized form of the conditioned analog signal, and a processor coupled to the analog-to-digital converter, wherein the processor is configured to control the operation of the analog-to-digital converter and to provide a digitized communication corresponding to the digitized form of the conditioned analog signal, wherein the piezoelectric element, the analog circuit, the analog-to-digital converter, and the processor are located within the housing, and (ii) an air gun cluster comprising at least one air gun, wherein the at least one air gun releases the compressed air into the water.

Example 19

The hydrophone system of Example 18, wherein the air gun cluster comprises at least two air guns, and wherein the housing is attached to the air gun cluster equidistant from the at least two air guns.

Example 20

The hydrophone system of Examples 18 or 19, wherein the hydrophone further comprises a transceiver coupled to the processor, wherein the transceiver is configured to receive the digitized communication and transmit the digitized serial communication over a communication link coupled to the air gun cluster.

While this disclosure has been described as having exemplary designs, the various disclosed embodiments may be further modified within the scope of the disclosure. This application is therefore intended to cover any variations, uses, or adaptations of the invention using its general principles. Further, this application is intended to cover such departures from the present disclosure as come within known or customary practice in the art to which this invention pertains.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A near-field hydrophone, comprising:
    a housing comprising a cylindrical portion and a sealed distal dome structure;
    a piezoelectric acoustic transducer configured to produce an analog signal in response to receiving a seismic source signature generated by the release of compressed air into water by at least one air gun disposed proximal to the near-field hydrophone, wherein the piezoelectric acoustic transducer is over-molded in place within the distal dome structure;
    an analog circuit coupled to the piezoelectric acoustic transducer, wherein the analog circuit is configured to receive the analog signal and to produce a conditioned analog signal;
    an analog-to-digital converter configured to receive the conditioned analog signal and to produce a digitized form of the conditioned analog signal; and
    a processor coupled to a memory circuit and to the analog-to-digital converter, wherein the processor is configured to control the operation of the analog-to-digital converter and to provide a digitized serial communication output corresponding to the digitized form of the conditioned analog signal;
    wherein the piezoelectric acoustic transducer, the analog circuit, the analog-to-digital converter, the processor, and the memory circuit of the near-field hydrophone are located within the housing.

2. The near-field hydrophone of claim 1, wherein the analog circuit comprises a charge amplifier and a filter circuit to produce the conditioned analog signal.

3. The near-field hydrophone of claim 1, further comprising:
    a transceiver coupled to the processor, wherein the transceiver is configured to receive the digitized serial communication and transmit the digitized serial communication over a communication link.

4. The near-field hydrophone of claim 3, wherein the communication link comprises a twisted pair of conductors, fiber optic cables, coaxial cables, or a combination thereof.

5. The near-field hydrophone of claim 3, wherein the transceiver is further coupled to a power supply circuit, and wherein the power supply circuit is configured to receive power through the communication link.

6. The near-field hydrophone of claim 1, wherein the housing is attached to an air gun cluster comprising the at least one air gun proximal to the near-field hydrophone.

7. The near-field hydrophone of claim 6, wherein the air gun cluster comprises at least two air guns, and wherein the housing is attached to the air gun cluster equidistant from the at least two air guns.

8. A near-field hydrophone system comprising:
    a near-field hydrophone, comprising:
        a housing comprising a cylindrical portion and a sealed distal dome structure;
        a piezoelectric acoustic transducer configured to produce an analog signal in response to receiving a seismic source signature generated by the release of compressed air into water by at least one air gun disposed proximal to the near-field hydrophone, wherein the piezoelectric acoustic transducer is over-molded in place within the distal dome structure;

an analog circuit coupled to the piezoelectric acoustic transducer, wherein the analog circuit is configured to receive the analog signal and to produce a conditioned analog signal;

an analog-to-digital converter configured to receive the conditioned analog signal and to produce a digitized form of the conditioned analog signal; and a processor coupled to the analog-to-digital converter, wherein the processor is configured to control the operation of the analog-to-digital converter and to provide a digitized communication corresponding to the digitized form of the conditioned analog signal;

wherein the piezoelectric acoustic transducer, the analog circuit, the analog-to-digital converter, and the processor of the near-field hydrophone are located within the housing; and an air gun cluster comprising the at least one air gun disposed proximal to the near-field hydrophone, wherein the at least one air gun releases the compressed air into the water.

9. The near-field hydrophone system of claim 8, wherein the air gun cluster comprises at least two air guns, and wherein the housing is attached to the air gun cluster equidistant from the at least two air guns.

10. The near-field hydrophone system of claim 8, wherein the near-field hydrophone further comprises a transceiver coupled to the processor, wherein the transceiver is configured to receive the digitized communication and transmit the digitized serial communication over a communication link coupled to the air gun cluster.

\* \* \* \* \*